(12) United States Patent
Morinaga et al.

(10) Patent No.: US 11,573,296 B2
(45) Date of Patent: Feb. 7, 2023

(54) OPTICAL MODULE AND DISTANCE MEASUREMENT DEVICE

(71) Applicants: HAMAMATSU PHOTONICS K.K., Hamamatsu (JP); JAPAN AUTOMOBILE RESEARCH INSTITUTE, Tokyo (JP)

(72) Inventors: Yuki Morinaga, Hamamatsu (JP); Daiki Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 734 days.

(21) Appl. No.: 16/489,005

(22) PCT Filed: Dec. 20, 2017

(86) PCT No.: PCT/JP2017/045829
§ 371 (c)(1),
(2) Date: Aug. 27, 2019

(87) PCT Pub. No.: WO2018/159077
PCT Pub. Date: Sep. 7, 2018

(65) Prior Publication Data
US 2020/0025890 A1 Jan. 23, 2020

(30) Foreign Application Priority Data
Feb. 28, 2017 (JP) ............................. JP2017-036261

(51) Int. Cl.
*G02B 26/08* (2006.01)
*G01S 7/481* (2006.01)
(Continued)

(52) U.S. Cl.
CPC .......... *G01S 7/4817* (2013.01); *G02B 26/085* (2013.01); *G02B 26/101* (2013.01); *G01S 17/931* (2020.01)

(58) Field of Classification Search
CPC ...... G01S 7/4817; G01S 17/931; G01S 7/497; G01S 17/42; G01S 7/481; G01S 17/93;
(Continued)

(56) References Cited

U.S. PATENT DOCUMENTS

2013/0003155 A1* 1/2013 Cugat ................. G02B 26/085
359/230
2016/0231557 A1* 8/2016 Lemaire ............... G02B 26/085

FOREIGN PATENT DOCUMENTS

CN 105934698 A 9/2016
EP 2944998 A1 11/2015
(Continued)

OTHER PUBLICATIONS

International Preliminary Report on Patentability issued in PCT/JP2017/045829 dated Sep. 12, 2019.

*Primary Examiner* — Euncha P Cherry
(74) *Attorney, Agent, or Firm* — Faegre Drinker Biddle & Reath LLP

(57) ABSTRACT

An optical module includes a support, a movable part supported by the support so as to be swingable about an axis, a mirror provided to the movable part, a drive coil provided to the movable part, a temperature monitoring element provided to the support, and a magnet that generates a magnetic field acting on the drive coil. The support is thermally connected to the magnet.

25 Claims, 15 Drawing Sheets

(51) Int. Cl.
  *G02B 26/10* (2006.01)
  *G01S 17/931* (2020.01)
(58) Field of Classification Search
  CPC .... G02B 26/085; G02B 26/101; G02B 26/10;
    B81B 3/00; G01C 3/06
  USPC ........................................................ 359/849
  See application file for complete search history.

(56) References Cited

FOREIGN PATENT DOCUMENTS

| | | |
|---|---|---|
| EP | 3719559 A1 | 10/2020 |
| JP | H08-334722 A | 12/1996 |
| JP | H10-90625 A | 4/1998 |
| JP | 2002-148536 A | 5/2002 |
| JP | 2002-182136 A | 6/2002 |
| JP | 2005-077285 A | 3/2005 |
| JP | 2005-156756 A | 6/2005 |
| JP | 2009-237239 A | 10/2009 |
| JP | 2011-125110 A | 6/2011 |
| WO | WO 2011/095231 A1 | 8/2011 |
| WO | WO-2014/109170 A1 | 7/2014 |
| WO | WO 2015/051820 A1 | 4/2015 |

\* cited by examiner

Fig.7
(a)
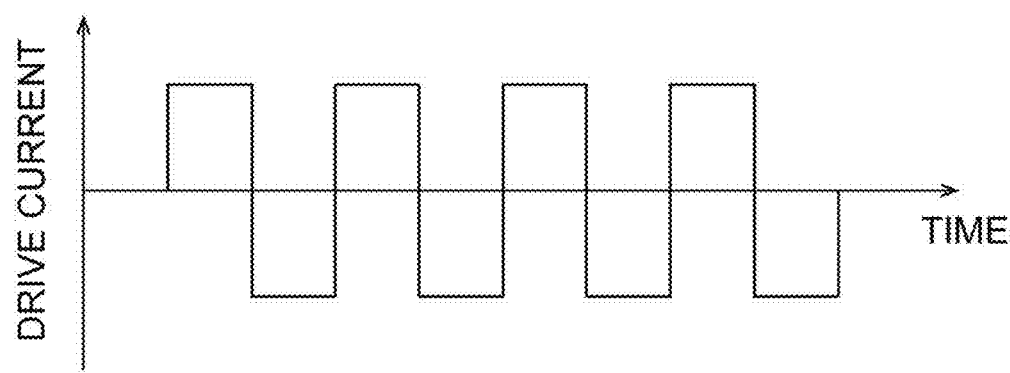
(b)
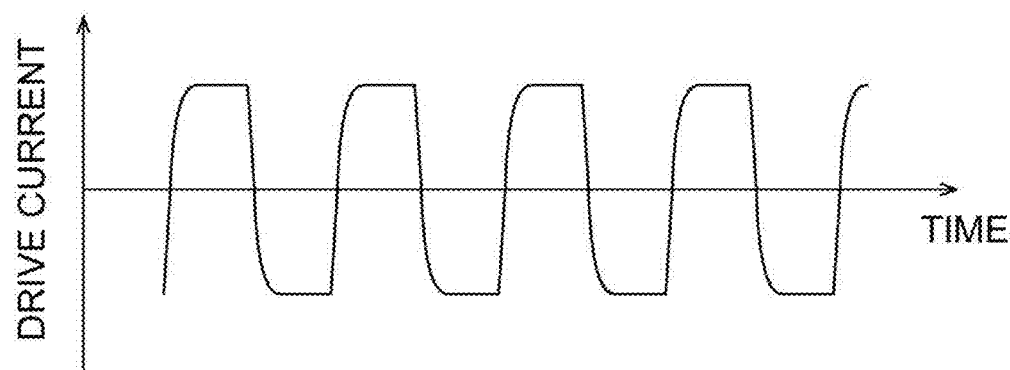

Fig.8
(a)
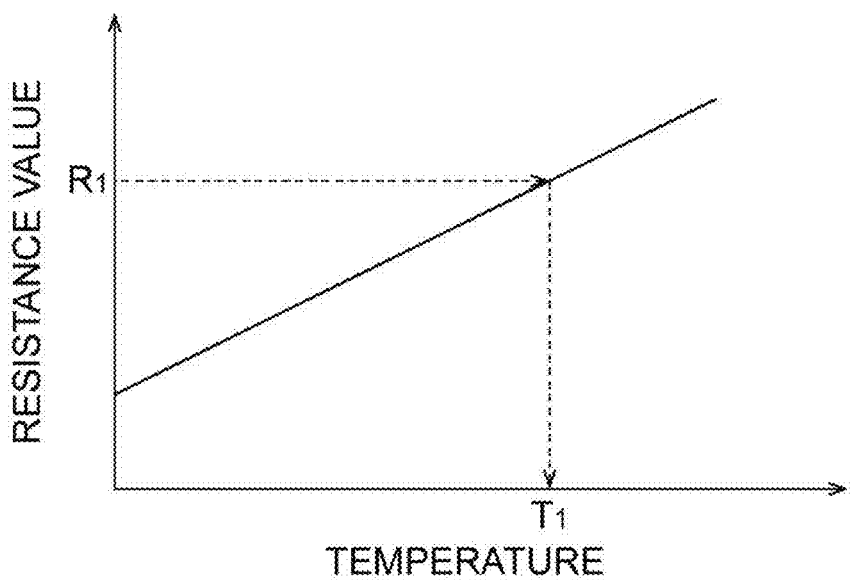
(b)
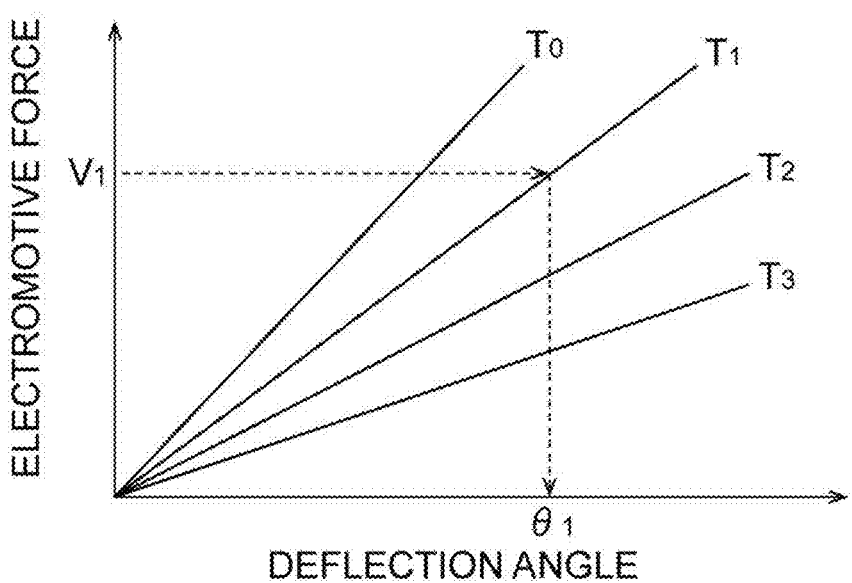

Fig.11
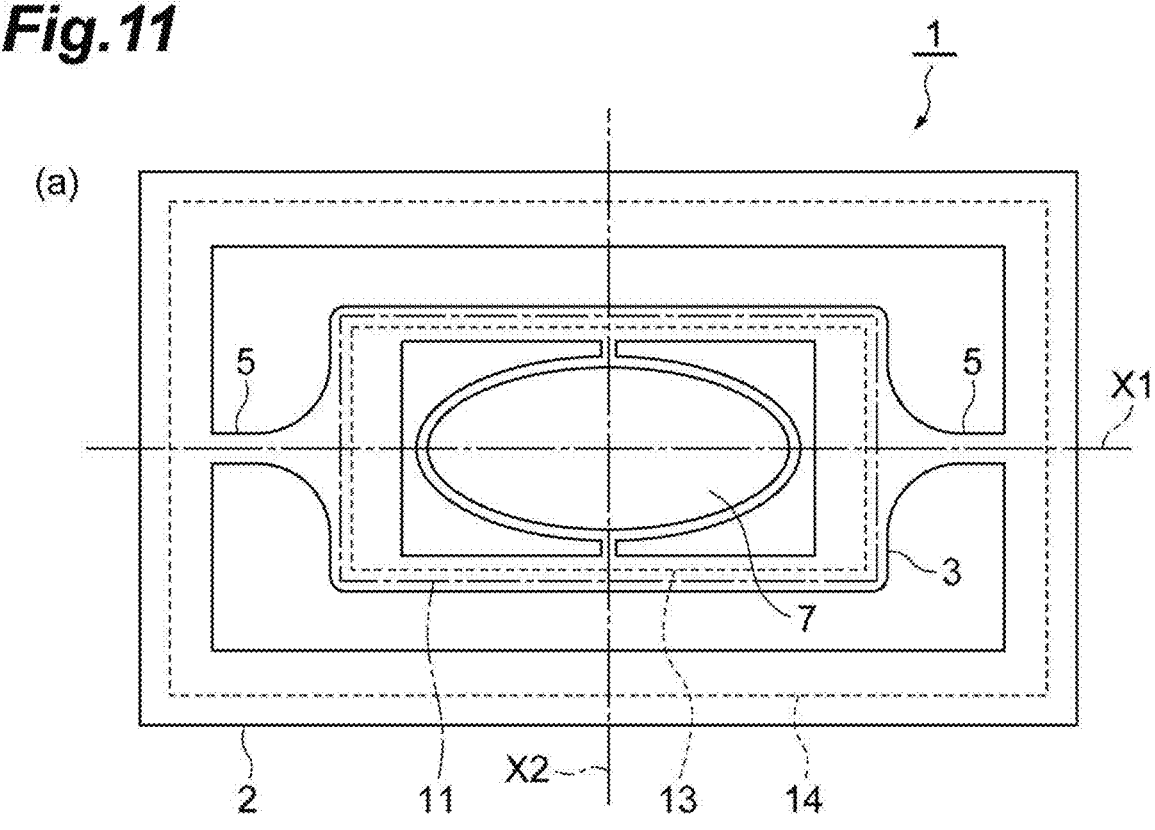
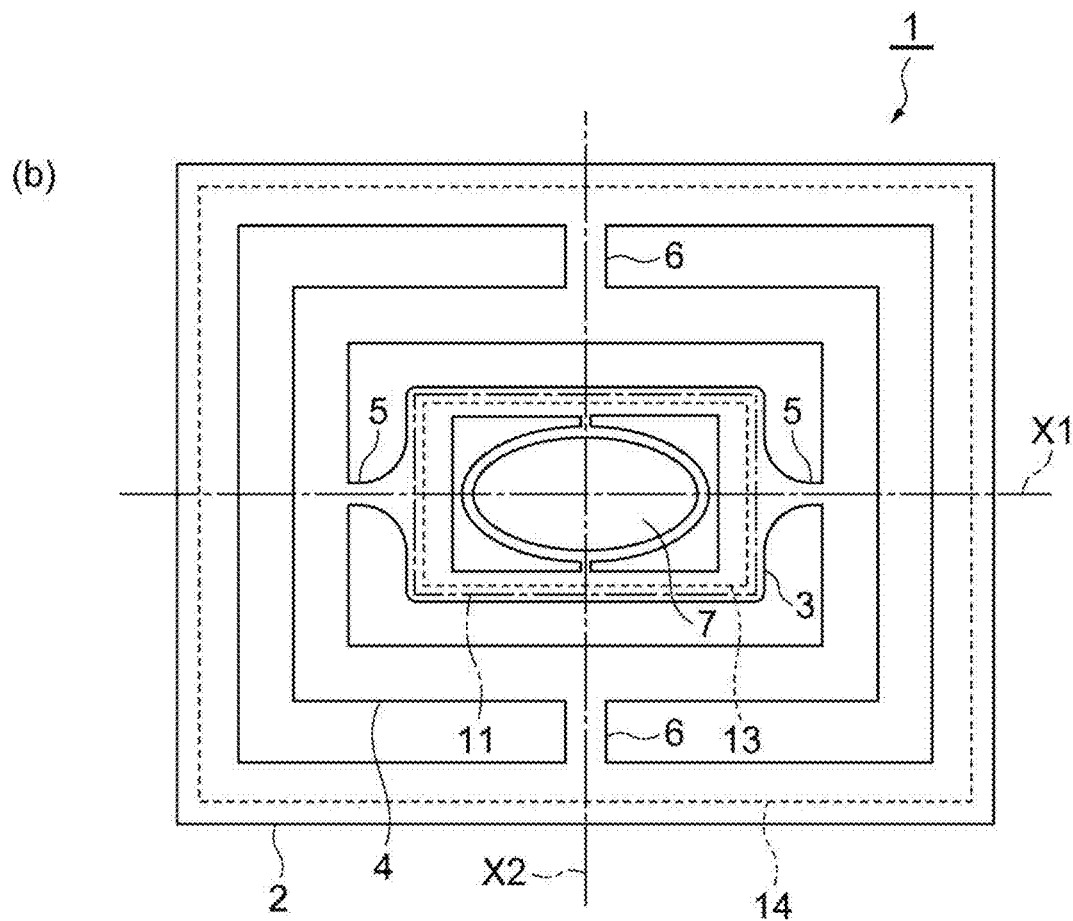

Fig.13
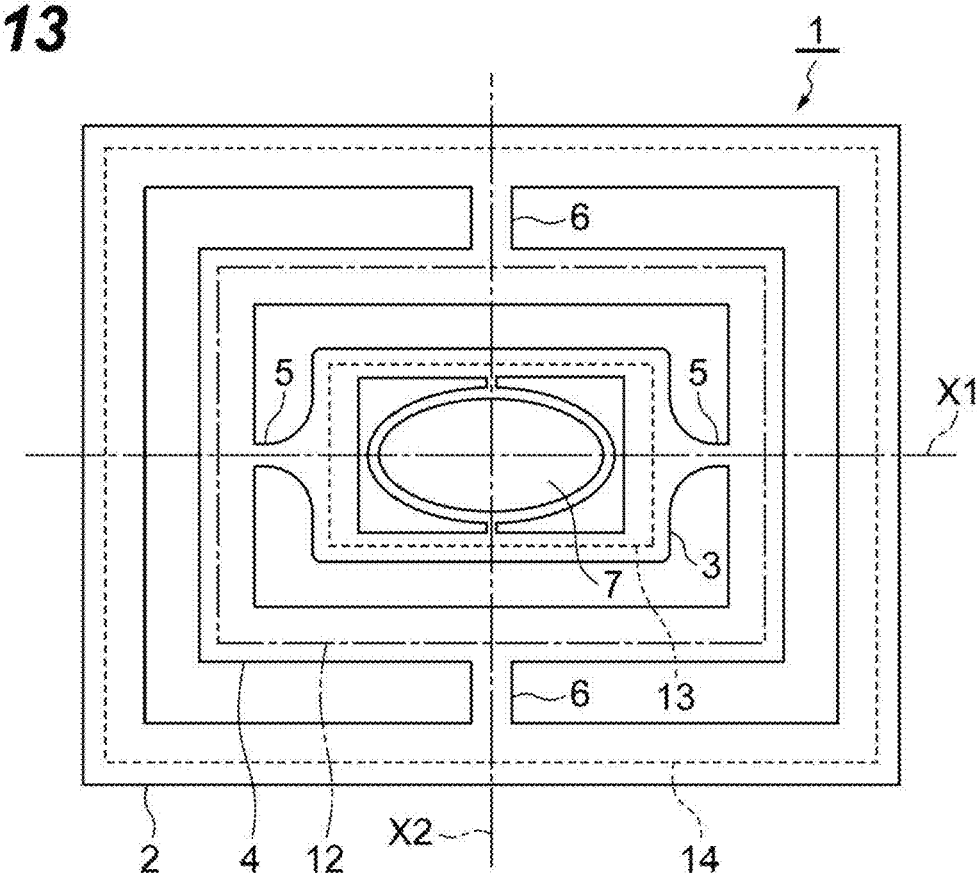
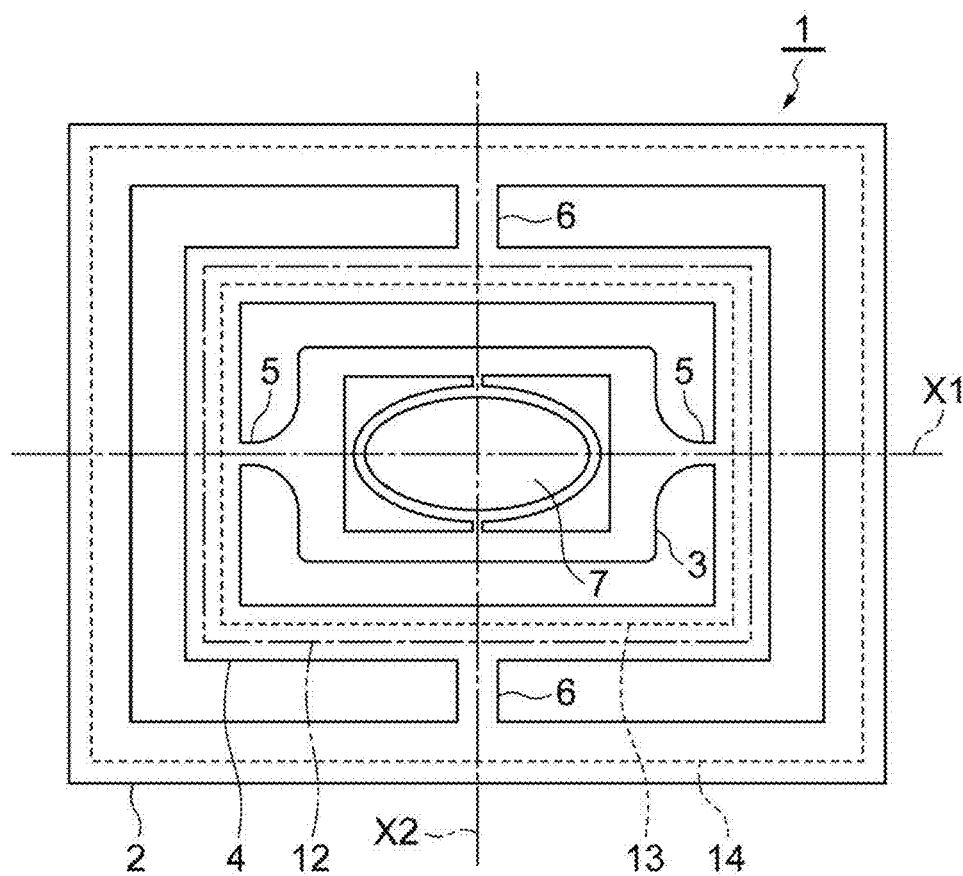

Fig.14
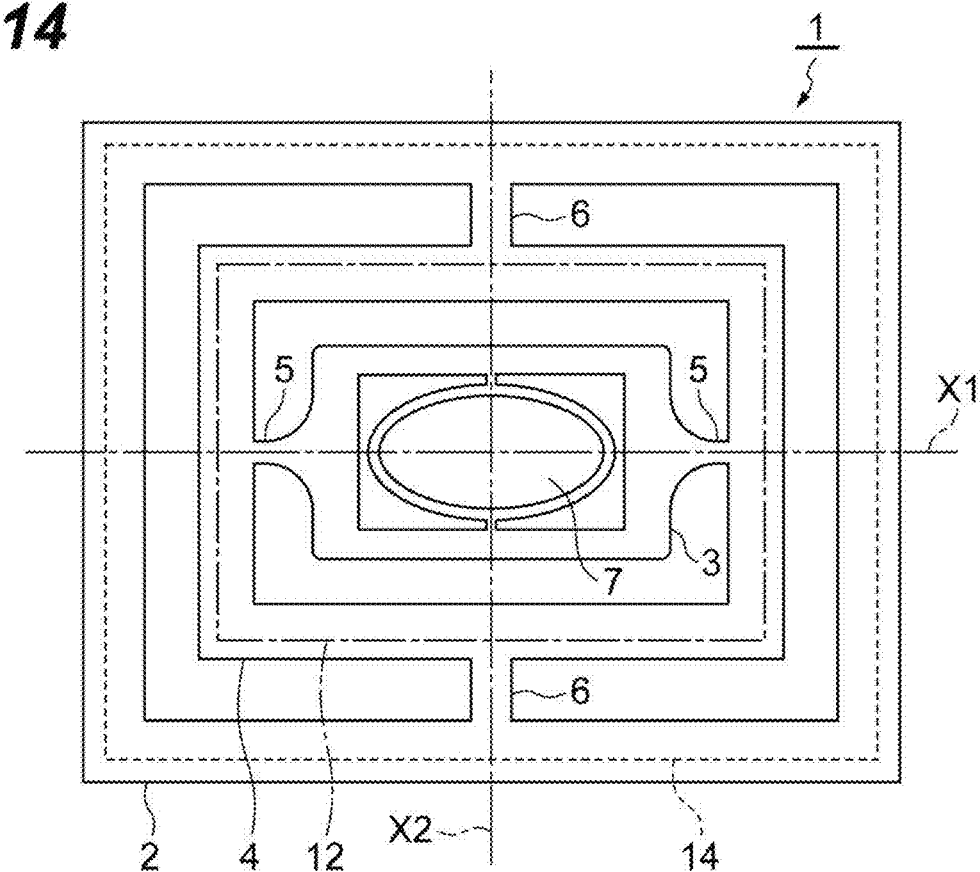
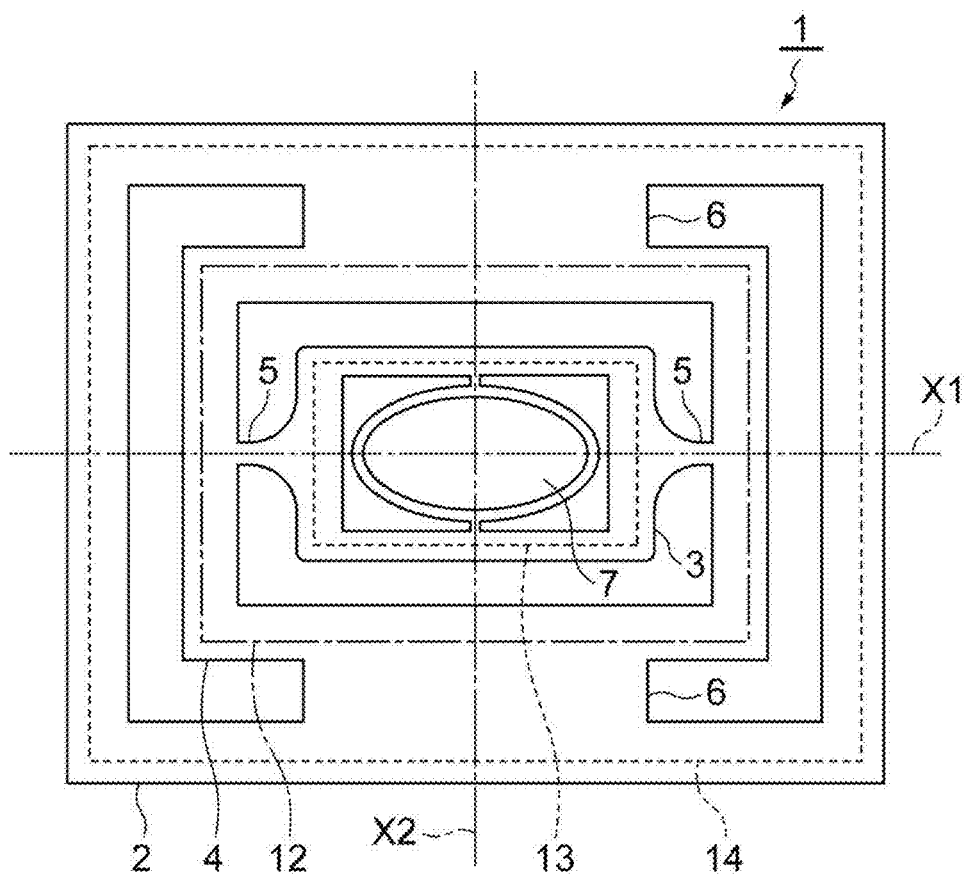

Fig.15
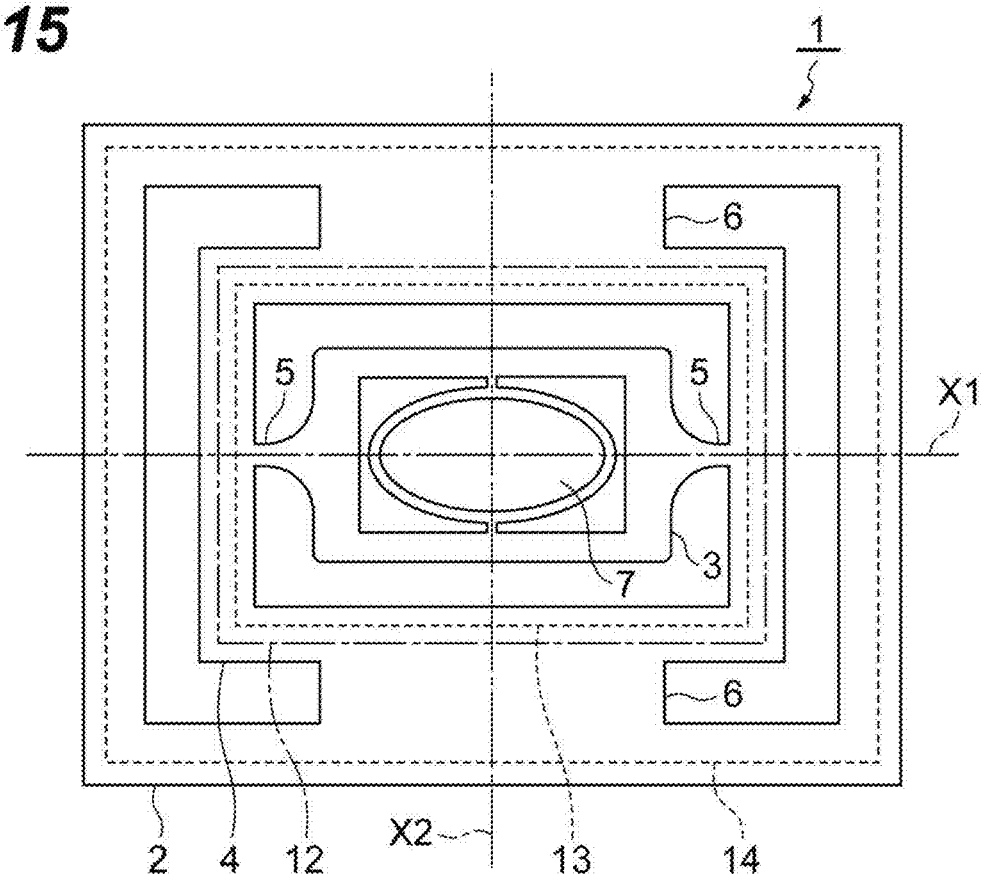
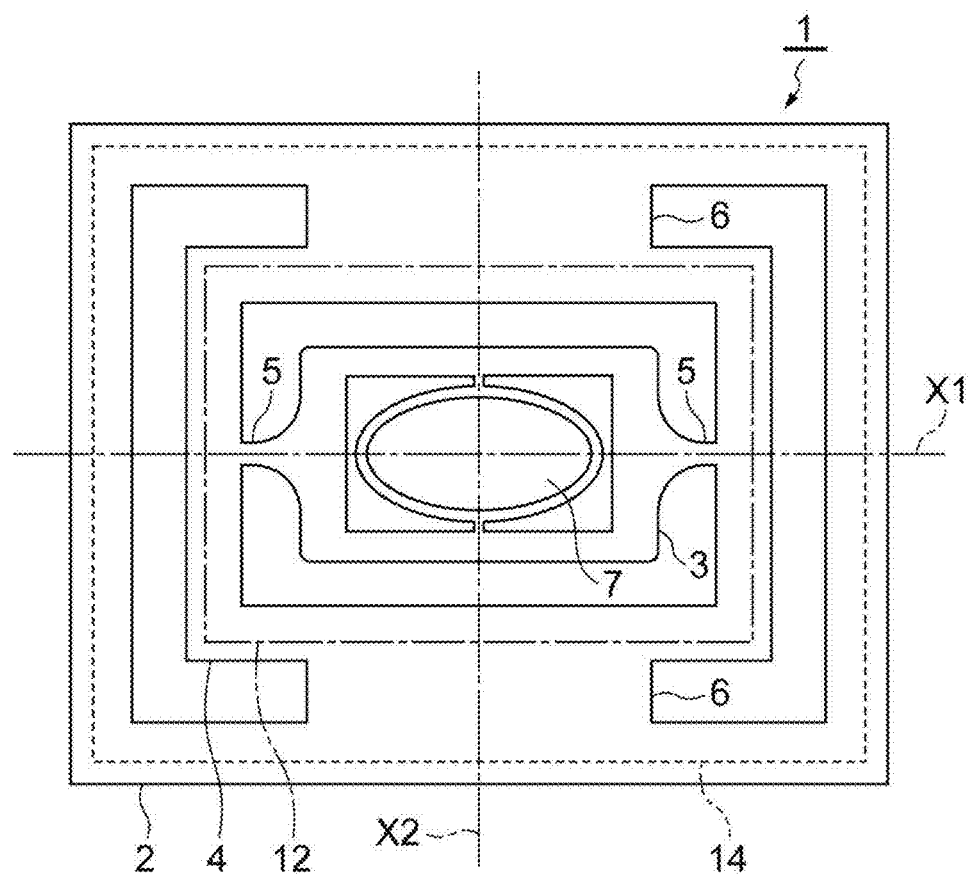

OPTICAL MODULE AND DISTANCE MEASUREMENT DEVICE

TECHNICAL FIELD

An aspect of the present invention relates to an optical module and a distance measurement device.

BACKGROUND ART

An optical module including an electromagnetically-driven Micro Electro Mechanical Systems (MEMS) mirror where a drive coil and an electromotive force monitoring coil are provided to a movable part is known (for example, see Patent Literatures 1 and 2). Since the movable part swings in a magnetic field of a magnet for generating the Lorentz force on the drive coil in such a MEMS mirror, an electromotive force is generated on the electromotive force monitoring coil provided to the movable part. Accordingly, information about the deflection angle of the movable part on which a mirror is provided, that is, the deflection angle of the mirror can be acquired based on the electromotive force generated on the electromotive force monitoring coil.

CITATION LIST

Patent Literature

Patent Literature 1: Japanese Unexamined Patent Publication No. 2002-182136
Patent Literature 2: Japanese Unexamined Patent Publication No. H10-90625

SUMMARY OF INVENTION

Technical Problem

However, since the magnetic flux density of a magnetic field generated by the magnet is changed in accordance with the temperature of the magnet in the above-mentioned optical module, information about the deflection angle of the mirror cannot be accurately acquired in a case where the temperature of the magnet is not considered. Particularly, in a case where the above-mentioned optical module is applied to an in-vehicle distance measurement device, an operating environment temperature is significantly changed and the temperature of the magnet is significantly changed due to a change in the operating environment temperature. For this reason, there is a concern that the accuracy of information about the deflection angle of the mirror may significantly deteriorate. Further, even when the optical module does not include the electromotive force monitoring coil, there is a case where information about the deflection angle of the mirror cannot be accurately acquired if the temperature of the magnet is not considered.

An object of an aspect of the invention is to provide an optical module from which information about the deflection angle of a mirror can be accurately acquired and a distance measurement device that includes the optical module.

Solution to Problem

An optical module according to an aspect of the invention includes a support, a movable part supported by the support so as to be swingable about an axis, a mirror provided to the movable part, a drive coil provided to the movable part, a temperature monitoring element provided to the support, and a magnet that generates a magnetic field acting on the drive coil. The support is thermally connected to the magnet.

In this optical module, the temperature monitoring element is provided to the support thermally connected to the magnet. Accordingly, the temperature of the temperature monitoring element reflects the temperature of the magnet, compared with a case where, for example, the temperature monitoring element is provided to the movable part together with the drive coil. The reason for this is that the temperature monitoring element is affected by heat generated from the drive coil and a space formed between the movable part and the magnet serves as a thermal resistor in a case where, for example, the temperature monitoring element is provided to the movable part together with the drive coil. According to this optical module, information about the deflection angle of the mirror can be accurately acquired in consideration of the magnetic flux density of the magnet, which changes in accordance with the temperature of the magnet, based on the detection value of the temperature monitoring element. A case where the temperature of the temperature monitoring element reflects the temperature of the magnet means that the temperature of the temperature monitoring element follows the temperature of the magnet in accordance with a predetermined relationship (for example, in accordance with a predetermined difference in temperature) without being limited to a case where the temperature of the temperature monitoring element is the same as the temperature of the magnet.

In the optical module according to the aspect of the invention, the movable part may include a first movable part supported by the support so as to be swingable about a first axis and a second movable part supported by the support so as to be swingable about a second axis crossing the first axis, the mirror may be provided to the first movable part, the first movable part may be connected to the second movable part so as to be swingable about the first axis, and the second movable part may be connected to the support so as to be swingable about the second axis. According to this, the mirror can be made to swing about the first and second axes.

In the optical module according to the aspect of the invention, the drive coil may include a first drive coil provided to the first movable part. According to this, the first movable part can be driven by the Lorentz force generated on the first drive coil.

The optical module according to the aspect of the invention may further include an electromotive force monitoring coil provided to the first movable part, and the magnet generates a magnetic field acting the drive coil and the electromotive force monitoring coil. According to this, information about the deflection angle of the mirror can be accurately acquired in consideration of the magnetic flux density of the magnet, which changes in accordance with the temperature of the magnet, based on the detection value of the temperature monitoring element and an electromotive force generated on the electromotive force monitoring coil.

In the optical module according to the aspect of the invention, the drive coil may include a second drive coil provided to the second movable part. According to this, the second movable part can be driven by the Lorentz force generated on the second drive coil.

The optical module according to the aspect of the invention may further include an electromotive force monitoring coil provided to the first movable part, and the magnet may generate a magnetic field acting the drive coil and the electromotive force monitoring coil. According to this, information about the deflection angle of the mirror can be accurately acquired in consideration of the magnetic flux density of the magnet, which changes in accordance with the temperature of the magnet, based on the detection value of the temperature monitoring element and an electromotive force generated on the electromotive force monitoring coil.

The optical module according to the aspect of the invention may further include an electromotive force monitoring coil provided to the second movable part, and the magnet may generate a magnetic field acting the drive coil and the electromotive force monitoring coil. According to this, information about the deflection angle of the mirror can be accurately acquired in consideration of the magnetic flux density of the magnet, which changes in accordance with the temperature of the magnet, based on the detection value of the temperature monitoring element and an electromotive force generated on the electromotive force monitoring coil.

In the optical module according to the aspect of the invention, the movable part may include a first movable part supported by the support so as to be swingable about a first axis and a second movable part supported by the support, the mirror may be provided to the first movable part, the first movable part may be connected to the second movable part so as to be swingable about the first axis, the second movable part may be connected to the support so that the first movable part is swingable about the first axis by the vibration of the second movable part, and the drive coil may include a second drive coil provided to the second movable part. According to this, the first movable part can be made to swing by the Lorentz force generated on the second drive coil.

The optical module according to the aspect of the invention may further include an electromotive force monitoring coil provided to the first movable part, and the magnet may generate a magnetic field acting the drive coil and the electromotive force monitoring coil. According to this, information about the deflection angle of the mirror can be accurately acquired in consideration of the magnetic flux density of the magnet, which changes in accordance with the temperature of the magnet, based on the detection value of the temperature monitoring element and an electromotive force generated on the electromotive force monitoring coil.

The optical module according to the aspect of the invention may further include an electromotive force monitoring coil provided to the second movable part, and the magnet may generate a magnetic field acting the drive coil and the electromotive force monitoring coil. According to this, information about the deflection angle of the mirror can be accurately acquired in consideration of the magnetic flux density of the magnet, which changes in accordance with the temperature of the magnet, based on the detection value of the temperature monitoring element and an electromotive force generated on the electromotive force monitoring coil.

The optical module according to the aspect of the invention may further include a connecting portion that connects the first movable part to the second movable part so that the first movable part is swingable about the first axis, and the width of the support may be larger than the width of the connecting portion when viewed in an optical axis direction of the mirror. According to this, since it is easy for the support to transfer heat, the temperature of the temperature monitoring element more accurately reflects the temperature of the magnet. Moreover, since the width of the connecting portion is smaller than the width of the support, it is difficult for heat, which is generated from the drive coil, to be transferred to the support through the connecting portion and the second movable part when the drive coil is provided to the first movable part. Accordingly, the temperature of the temperature monitoring element more accurately reflects the temperature of the magnet.

The optical module according to the aspect of the invention may further include a connecting portion that connects the second movable part to the support so that the second movable part is swingable about the second axis, and the width of the support may be larger than the width of the connecting portion when viewed in an optical axis direction of the mirror. According to this, since it is easy for the support to transfer heat, the temperature of the temperature monitoring element more accurately reflects the temperature of the magnet. Moreover, since the width of the connecting portion is smaller than the width of the support, it is difficult for heat, which is generated from the drive coil, to be transferred to the support through the connecting portion. Accordingly, the temperature of the temperature monitoring element more accurately reflects the temperature of the magnet.

In the optical module according to the aspect of the invention, the temperature monitoring element may be a temperature monitoring resistor of which a resistance value is changed in accordance with temperature. According to this, the temperature monitoring element can be easily formed with a simple structure.

In the optical module according to the aspect of the invention, the temperature monitoring resistor may be configured as a coil. According to this, the temperature monitoring resistor having a length sufficient to detect a change in a resistance value can be realized in a limited region.

The optical module according to the aspect of the invention may further include an electrode pad provided to the support and a wire connected to one end of the drive coil and the electrode pad, and the electrode pad may be provided to side the temperature monitoring resistor when viewed in the optical axis direction of the mirror. According to this, since it is possible to avoid a situation where the wire connected to the electrode pad crosses the temperature monitoring resistor, the transfer of the heat of the wire to the temperature monitoring resistor can be suppressed.

In the optical module according to the aspect of the invention, the support may be formed in a frame shape so as to surround the movable part when viewed in the optical axis direction of the mirror. According to this, the stable support of the first movable part can be realized.

In the optical module according to the aspect of the invention, the temperature monitoring element may be provided to the support along an outer edge of the support when viewed in the optical axis direction. According to this, it is more difficult for the temperature monitoring element to be affected by heat generated from the drive coil. Further, when the temperature monitoring element is a temperature monitoring resistor, it is easier to ensure the length of the temperature monitoring resistor sufficient to detect a change in a resistance value.

In the optical module according to the aspect of the invention, the drive coil and the temperature monitoring element may be arranged along the same plane. According to this, the drive coil and the temperature monitoring element can be easily formed in a case where the support, the movable part, the mirror, the drive coil, and the temperature monitoring element are manufactured by semiconductor manufacturing processes.

In the optical module according to the aspect of the invention, the drive coil, the electromotive force monitoring coil, and the temperature monitoring element may be arranged along the same plane. According to this, the drive coil, the electromotive force monitoring coil, and the temperature monitoring element can be easily formed in a case where the support, the movable part, the mirror, the drive coil, the electromotive force monitoring coil, and the temperature monitoring element are manufactured by semiconductor manufacturing processes.

In the optical module according to the aspect of the invention, the drive coil may be embedded in the movable part. According to this, since the resistance value of the drive coil can be reduced by an increase in the cross-sectional area of the drive coil, the power consumption of the drive coil can be reduced.

In the optical module according to the aspect of the invention, the electromotive force monitoring coil may be embedded in the movable part. According to this, since the resistance value of the electromotive force monitoring coil can be reduced by an increase in the cross-sectional area of the electromotive force monitoring coil, noise at the time of generation of crosstalk in the electromotive force monitoring coil can be reduced.

In the optical module according to the aspect of the invention, the temperature monitoring element may be embedded in the support. According to this, the temperature of the temperature monitoring element more accurately reflects the temperature of the magnet.

The optical module according to the aspect of the invention may further include a package that houses the support, the movable part, the mirror, the drive coil, and the temperature monitoring element, the support may be mounted on an inner surface of a base that is a part of the package, and the magnet may be mounted on an outer surface of the base so as to face the movable part. According to this, the configuration of the optical module can be simplified while the support, the movable part, the mirror, the drive coil, and the temperature monitoring element can be protected from the outside.

In the optical module according to the aspect of the invention, a recessed portion may be formed on the inner surface of the base so as to face the movable part. According to this, since the thickness of the support can be reduced while physical interference between the movable part and the base can be prevented, the temperature of the temperature monitoring element more accurately reflects the temperature of the magnet.

In the optical module according to the aspect of the invention, the package may include a tubular side wall disposed so as to surround the support when the package is viewed in the optical axis direction of the mirror, and the thickness of the base in the optical axis direction of the mirror may be smaller than a distance between the side wall and the support when viewed in the optical axis direction of the mirror. According to this, since it is easy for the heat of the magnet to be transferred to the support through the base but it is difficult for heat to be transferred to the support from the side wall, the temperature of the temperature monitoring element more accurately reflects the temperature of the magnet.

The optical module according to the aspect of the invention may further include a control unit that controls drive current to be applied to the drive coil based on a detection value of the temperature monitoring element and an electromotive force generated on the electromotive force monitoring coil. According to this, the mirror can be made to swing at a desired deflection angle.

A distance measurement device according to an aspect of the invention includes the above-mentioned optical module, a light source that emits laser light, and a photodetector that detects the laser light through an object and the mirror.

Since the mirror can be made to swing at a desired deflection angle regardless of a change in the operating environment temperature, the highly accurate measurement of a distance can be realized in this distance measurement device.

Advantageous Effects of Invention

According to an aspect of the invention, it is possible to provide an optical module from which information about the deflection angle of a mirror can be accurately acquired and a distance measurement device that includes the optical module.

BRIEF DESCRIPTION OF DRAWINGS

FIG. 7(a) is a waveform diagram of drive current input to a filter illustrated in FIG. 6. FIG. 7(b) is a waveform diagram of drive current output from the filter illustrated in FIG. 6

FIG. 8(a) is a diagram illustrating a relationship between the temperature and the resistance value of a temperature monitoring resistor. FIG. 8(b) is a diagram illustrating a relationship between the deflection angle and the electromotive force of an electromotive force monitoring coil.

FIG. 11(a) is a schematic plan view of a MEMS mirror of a first modification. FIG. 11(b) is a schematic plan view of a MEMS mirror of a second modification.

FIG. 13(a) is a schematic plan view of a MEMS mirror of a fifth modification. FIG. 13(b) is a schematic plan view of a MEMS mirror of a sixth modification.

FIG. 14(a) is a schematic plan view of a MEMS mirror of a seventh modification. FIG. 14(b) is a schematic plan view of a MEMS mirror of an eighth modification.

FIG. 15(a) is a schematic plan view of a MEMS mirror of a ninth modification. FIG. 15(b) is a schematic plan view of a MEMS mirror of a tenth modification.

DESCRIPTION OF EMBODIMENTS

Figure 1:
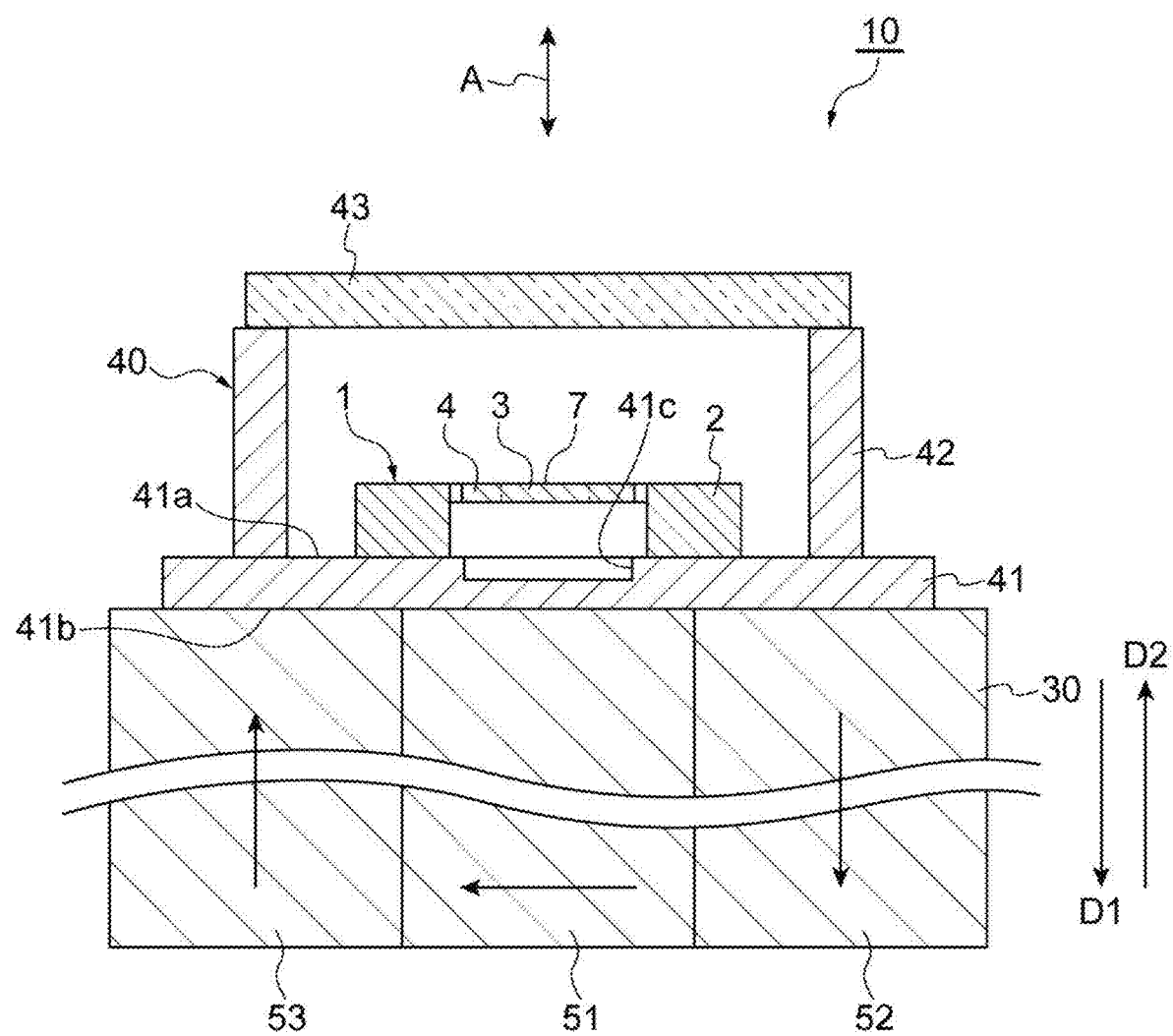
FIG. 1 is a cross-sectional view of a part of an optical module of an embodiment.

Embodiments of the invention will be described in detail below with reference to the drawings. The same portions or corresponding portions in the respective drawings will be denoted by the same reference numerals and the repeated description thereof will be omitted.

As illustrated in FIG. 1, an optical module 10 includes an electromagnetically-driven MEMS mirror 1, a magnet 30, and a package 40. The magnet 30 is formed of, for example, a permanent magnet so as to have a rectangular plate shape. The magnet 30 generates a magnetic field that is to act on the MEMS mirror 1. The package 40 is disposed on the magnet 30. The package 40 accommodates the MEMS mirror 1.

The package 40 includes a base 41, a side wall 42, and a window member 43. The base 41 is made of, for example, a non-magnetic material, such as aluminum nitride or aluminum oxide, so as to have a rectangular plate shape. The side wall 42 is made of, for example, a non-magnetic material, such as aluminum nitride or aluminum oxide, so as to have a rectangular tube shape. Anti-reflection films are formed on both surfaces of a base made of, for example, a translucent material, such as glass, and having a rectangular plate shape, so that the window member 43 is formed. The window member 43 is joined to the side wall 42 by, for example, low-melting-point glass so as to hermetically seal one opening of the side wall 42. The base 41 is joined to the side wall 42 by, for example, low-melting-point glass so as to hermetically seal the other opening of the side wall 42. The base 41 and the side wall 42 may be integrally made of a non-magnetic material. Further, one opening of the side wall 42 (that is, the opening sealed by the window member 43) may be inclined with respect to the base 41.

A support 2, which is included in the MEMS mirror 1, is mounted on an inner surface 41a of the base 41 (a surface, which forms the inner surface of the package 40, of the surfaces of the base 41) with, for example, a resin. The magnet 30 is mounted on an outer surface 41b of the base 41 (a surface, which forms the outer surface of the package 40, of the surfaces of the base 41) with, for example, a resin. The magnet 30 faces a first movable part 3, which is included in the MEMS mirror 1, with the base 41 disposed therebetween. Hereinafter, a direction, which is perpendicular to a mirror 7 included in the MEMS mirror 1 in a state where the mirror 7 is not operated, will referred to as an optical axis direction A. The side wall 42 is disposed so as to surround the support 2 when viewed in the optical axis direction A. The thickness of the base 41 in the optical axis direction A is smaller than a distance (the minimum distance) between the side wall 42 and the support 2 when viewed in the optical axis direction A. The thickness of the base 41 in the optical axis direction A is, for example, the thickness (the maximum thickness) of a region of the base 41 overlapping with the support 2 when viewed in the optical axis direction A.

The magnet 30 is formed of, for example, a combination of a plurality of magnets. The magnet 30 includes a first magnet 51 and a pair of second magnets 52 and 53 disposed to sandwich the first magnet. The first magnet 51 and the second magnets 52 and 53 are arranged so that magnetic poles thereof form a Halbach array (that is, the magnet 30 has a Halbach structure). The second magnet 52 is disposed so that a first magnetic pole (for example, an N pole) of the second magnet 52 is positioned on a bottom surface side (a side opposite to the MEMS mirror 1) and a second magnetic pole (for example, an S pole) of the second magnet 52 is positioned on an upper surface side (a side facing the MEMS mirror 1). The second magnet 53 is oriented in a direction opposite to the second magnet 52. That is, the second magnet 53 is disposed so that a first magnetic pole of the second magnet 53 is positioned on an upper surface side and a second magnetic pole of the second magnet 53 is positioned on a bottom surface side. That is, the first magnet 51 is disposed so that a first magnetic pole of the first magnet 51 is positioned on a side facing the second magnet 53 and a second magnetic pole of the first magnet 51 is positioned on a side facing the second magnet 52. The first magnet 51 and the second magnets 52 and 53 are combined so that the magnetic poles are arranged as described above. For this reason, a force acts on the first magnet 51 in a direction D1 toward the bottom surface from the upper surface due to an attractive force and a repulsive force between the magnetic poles. On the other hand, a force acts on the second magnets 52 and 53 in a direction D2 toward the upper surface from the bottom surface.

Figure 2:
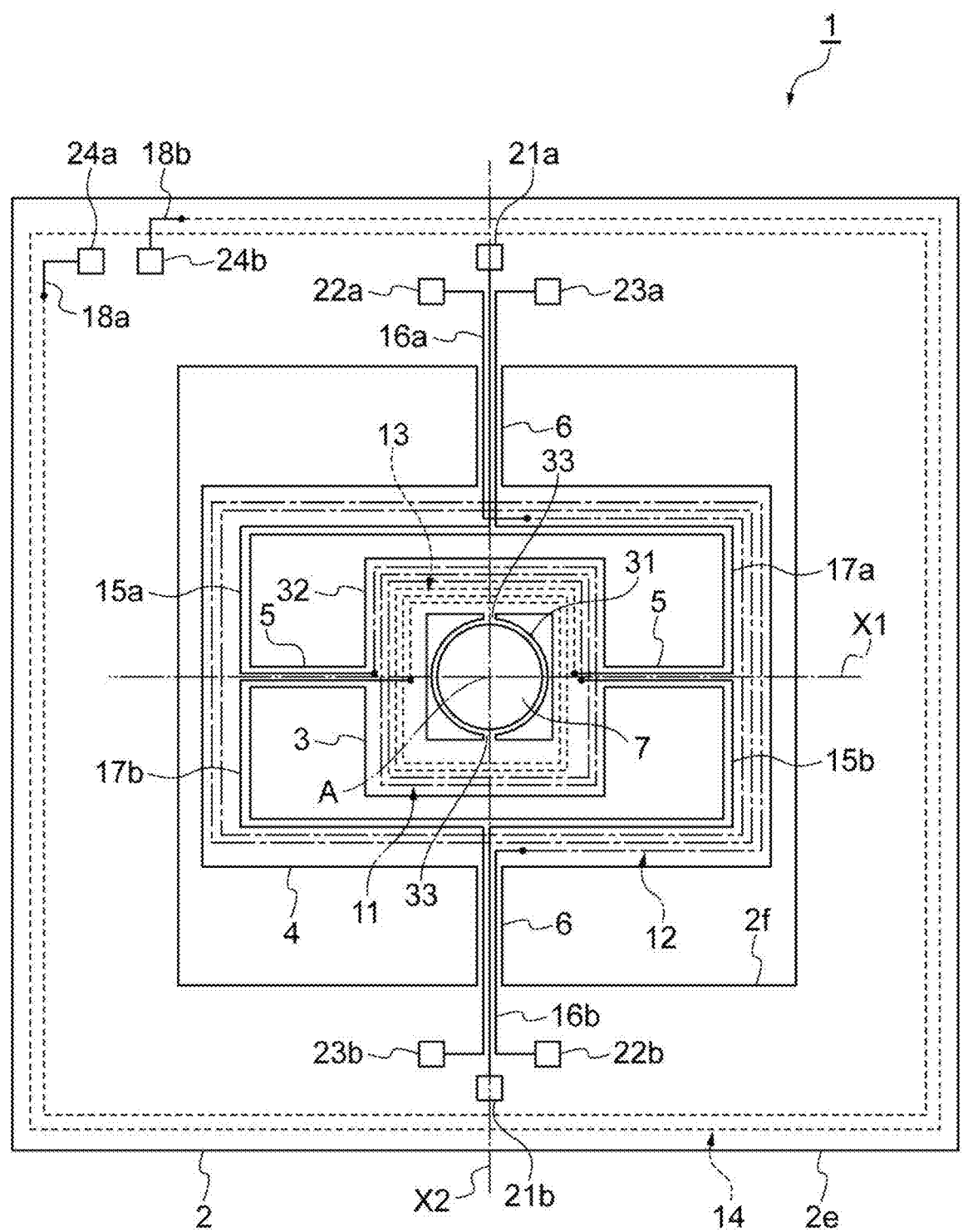
FIG. 2 is a plan view of a MEMS mirror illustrated in FIG. 1.

As illustrated in FIG. 2, the MEMS mirror 1 includes the support 2, the first movable part 3, a second movable part 4, a pair of first connecting portions 5, a pair of second connecting portions 6, and the mirror 7. The support 2, the first movable part 3, the second movable part 4, the pair of first connecting portions 5, and the pair of second connecting portions 6 are integrally made of silicone, for example.

The first movable part 3 is formed in, for example, a rectangular plate shape. The second movable part 4 is formed in, for example, a rectangular ring shape so as to surround the first movable part 3 with an interval between the first and second movable parts 3 and 4 when viewed in the optical axis direction A. The support 2 is formed in, for example, a rectangular frame shape so as to surround the second movable part 4 with an interval between the support 2 and the second movable part 4 when viewed in the optical axis direction A. That is, the support 2 is formed in a frame shape so as to surround the first and second movable parts 3 and 4 when viewed in the optical axis direction A. The second movable part 4 may be formed in an arbitrary shape, such as a polygonal ring shape or a circular ring shape, when viewed in the optical axis direction A.

The first movable part 3 is connected to the second movable part 4 via the pair of first connecting portions 5 so as to be swingable about a first axis X1. That is, the first movable part 3 is supported by the support 2 so as to be swingable about the first axis X1. The first movable part 3 includes a first portion 31 and a second portion 32. The first portion 31 is formed in, for example, a circular shape when viewed in the optical axis direction A. The second portion 32 is formed in, for example, a rectangular ring shape when viewed in the optical axis direction A. The first portion 31 is surrounded by the second portion 32 when viewed in the optical axis direction A. The first portion 31 is connected to the second portion 32 through a plurality of connection portions 33. That is, an interval is formed between the first and second portions 31 and 32 except for the plurality of connection portions 33. The plurality of connection portions 33 are positioned at, for example, middle portions of two sides among inner edges of the rectangular second portion 32. The second movable part 4 is connected to the support 2 via the pair of second connecting portions 6 so as to be swingable about a second axis X2. That is, the second movable part 4 is supported by the support 2 so as to be swingable about the second axis X2. The first axis X1 and the second axis X2 are perpendicular to the optical axis direction A, and cross each other (here, the first axis X1 and the second axis X2 are orthogonal to each other). The first portion 31 may be formed in a rectangular shape or a polygonal shape when viewed in the optical axis direction A. The second portion 32 may be formed in a polygonal ring shape, which has five or more sides, or a circular ring shape when viewed in the optical axis direction A.

The pair of first connecting portions 5 is disposed on the first axis X1 to sandwich the first movable part 3 in the interval between the second portion 32 of the first movable part 3 and the second movable part 4. Each of the first connecting portions 5 functions as a torsion bar. The pair of first connecting portions 5 connects the first movable part 3 to the second movable part 4 so that the first movable part 3 can swing about the first axis X1. When viewed in the optical axis direction A, the width (maximum width) of the support 2 is larger than the width (maximum width) of each first connecting portion 5. The pair of second connecting portions 6 is disposed on the second axis X2 to sandwich the second movable part 4 in the interval between the second movable part 4 and the support 2. Each of the second connecting portions 6 functions as a torsion bar. The pair of second connecting portions 6 connects the second movable part 4 to the support 2 so that the second movable part 4 can swing about the second axis X2. When the support 2 and the second connecting portions 6 are viewed in the optical axis direction A, the width (maximum width) of the support 2 is larger than the width (maximum width) of each second connecting portion 6. The width of the support 2 is a distance between the inner edge and the outer edge of the support 2 when viewed in the optical axis direction A. The width of the first connecting portion 5 is the length of the first connecting portion 5 in a direction orthogonal to both the extending direction of the first connecting portion 5 (a direction along the first axis X1) and the optical axis direction A. The width of the second connecting portion 6 is the length of the second connecting portion 6 in a direction orthogonal to both the extending direction of the second connecting portion 6 (a direction along the second axis X2) and the optical axis direction A.

The mirror 7 is provided to the first portion 31 of the first movable part 3. The mirror 7 is formed on one surface of the first portion 31 (the surface of the first portion 31 facing the window member 43) so as to include the point of intersection between the first and second axes X1 and X2. The mirror 7 is made of, for example, a metal material, such as aluminum, an aluminum alloy, gold, or silver, so as to have a circular, elliptical, or rectangular film shape. The center of the mirror 7 coincides with the point of intersection between the first and second axes X1 and X2 when viewed in the optical axis direction A. Since the mirror 7 is provided to the first portion 31 connected to the second portion 32 via the plurality of connection portions 33 as described above, the occurrence of the deformation, such as bending, of the mirror 7 is suppressed when the first movable part 3 swings about the first axis X1 at a resonant frequency level.

The MEMS mirror 1 further includes a first drive coil 11, a second drive coil 12, wires 15a and 15b, wires 16a and 16b, electrode pads 21a and 21b, and electrode pads 22a and 22b. In FIG. 2, for the convenience of description, the first and second drive coils 11 and 12 are illustrated by a dashed-dotted line and the wires 15a and 15b and the wires 16a and 16b are illustrated by a solid line.

The first drive coil 11 is provided to the second portion 32 of the first movable part 3. The first drive coil 11 is wound a plurality of times in a spiral shape in a region (that is, the second portion 32) outside the mirror 7 when viewed in the optical axis direction A. A magnetic field, which is generated by the magnet 30, acts on the first drive coil 11.

Figure 3:
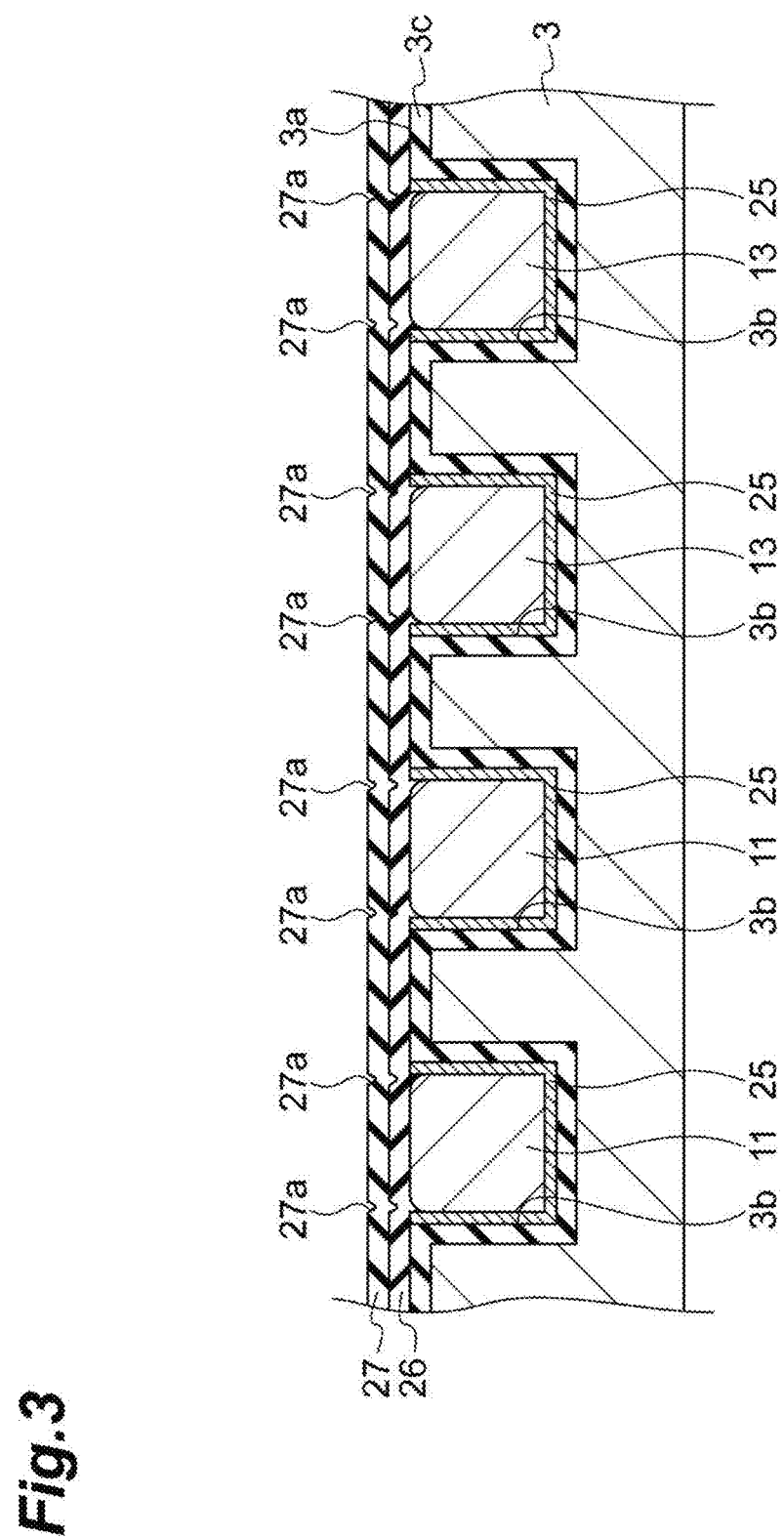
FIG. 3 is a cross-sectional view of a first drive coil and an electromotive force monitoring coil illustrated in FIG. 2 and the peripheral portions thereof.

As illustrated in FIG. 3, the first drive coil 11 is disposed in a groove 3b formed on a surface 3a of the first movable part 3. That is, the first drive coil 11 is embedded in the first movable part 3. An insulating layer 3c made of, for example, silicon oxide, silicon nitride, or the like is provided on the surface 3a of the first movable part 3 and the inner surface of the groove 3b. A seed layer 25 made of, for example, titanium, titanium nitride, copper, chromium, or the like is provided on the insulating layer 3c in the groove 3b. The first drive coil 11 is formed by, for example, a damascene method of embedding a metal material, such as copper, in the groove 3b with the insulating layer 3c and the seed layer 25 interposed between the metal material and the groove 3b. An insulating layer 26 and an insulating layer 27 made of, for example, silicon oxide, silicon nitride, or the like are provided on the surface 3a of the first movable part 3 so as to cover the first drive coil 11. In the first movable part 3, grooves 27a are formed on the surface of the insulating layer 27 along the inner and outer edges of the groove 3b in which the first drive coil 11 is disposed.

As illustrated in FIG. 2, one end of the first drive coil 11 is connected to the electrode pad 21a via the wire 15a. The wire 15a is formed between the insulating layers 26 and 27 (see FIG. 3), and extends to the support 2 from the first movable part 3 via one first connecting portion 5, the second movable part 4, and one second connecting portion 6. The electrode pad 21a is formed between the insulating layers 26 and 27 (see FIG. 3), and is exposed to the outside from an opening formed in the insulating layer 27. The wire 15a and the electrode pad 21a are integrally made of, for example, a metal material, such as tungsten, aluminum, gold, silver, copper, or an aluminum alloy. The first drive coil 11 and the wire 15a are connected to each other through an opening formed in the insulating layer 26.

The other end of the first drive coil 11 is connected to the electrode pad 21b through the wire 15b. The wire 15b is formed between the insulating layers 26 and 27 (see FIG. 3), and extends to the support 2 from the first movable part 3 through the other first connecting portion 5, the second movable part 4, and the other second connecting portion 6. The electrode pad 21b is formed between the insulating layers 26 and 27 (see FIG. 3), and is exposed to the outside from an opening formed in the insulating layer 27. The wire 15b and the electrode pad 21b are made of, for example, a metal material, such as tungsten, aluminum, gold, silver, copper, or an aluminum alloy, so as to be integrated with each other. The first drive coil 11 and the wire 15b are connected to each other through an opening formed in the insulating layer 26. The electrode pads 21a and 21b are external terminals and are electrically connected to a drive source, which is disposed outside the MEMS mirror 1, or the like via, for example, wires.

The second drive coil 12 is provided to the second movable part 4. The second drive coil 12 is wound a plurality of times in a spiral shape in the second movable part 4. A magnetic field, which is generated by the magnet 30, acts on the second drive coil 12.

Figure 4:
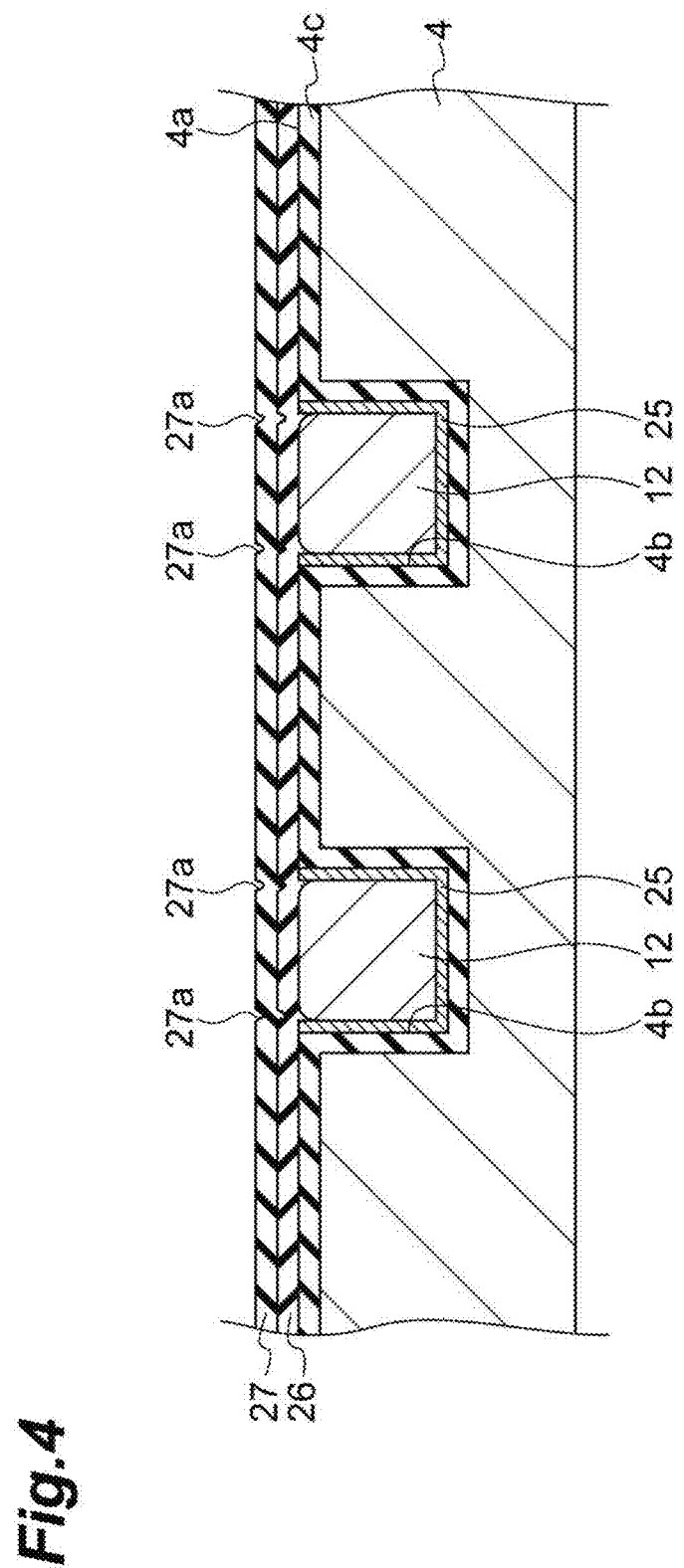
FIG. 4 is a cross-sectional view of a second drive coil illustrated in FIG. 2 and the peripheral portion thereof.

As illustrated in FIG. 4, the second drive coil 12 is disposed in a groove 4b formed on a surface 4a of the second movable part 4. That is, the second drive coil 12 is embedded in the second movable part 4. An insulating layer 4c made of, for example, silicon oxide, silicon nitride, or the like is provided on the surface 4a of the second movable part 4 and the inner surface of the groove 4b. A seed layer 25 is provided on the insulating layer 4c in the groove 4b. The second drive coil 12 is formed by, for example, a damascene method of embedding a metal material, such as copper, in the groove 4b with the insulating layer 4c and the seed layer 25 interposed between the metal material and the groove 4b. The insulating layer 26 and the insulating layer 27 are provided on the surface 4a of the second movable part 4 so as to cover the second drive coil 12. In the second movable part 4, grooves 27a are formed on the surface of the insulating layer 27 along the inner and outer edges of the groove 4b in which the second drive coil 12 is disposed.

As illustrated in FIG. 2, one end of the second drive coil 12 is connected to the electrode pad 22a through the wire 16a. The wire 16a is formed between the insulating layers 26 and 27 (see FIG. 4), and extends to the support 2 from the second movable part 4 through one second connecting portion 6. The electrode pad 22a is formed between the insulating layers 26 and 27 (see FIG. 4), and is exposed to the outside from an opening formed in the insulating layer 27. The wire 16a and the electrode pad 22a are integrally made of, for example, a metal material, such as tungsten, aluminum, gold, silver, copper, or an aluminum alloy. The second drive coil 12 and the wire 16a are connected to each other through an opening formed in the insulating layer 26.

The other end of the second drive coil 12 is connected to the electrode pad 22b through the wire 16b. The wire 16b is formed between the insulating layers 26 and 27 (see FIG. 4), and extends to the support 2 from the second movable part 4 through the other second connecting portion 6. The electrode pad 22b is formed between the insulating layers 26 and 27 (see FIG. 4), and is exposed to the outside from an opening formed in the insulating layer 27. The wire 16b and the electrode pad 22b are integrally made of, for example, a metal material, such as tungsten, aluminum, gold, silver, copper, or an aluminum alloy. The second drive coil 12 and the wire 16b are connected to each other through an opening formed in the insulating layer 26. The electrode pads 22a and 22b are external terminals and are electrically connected to a drive source, which is disposed outside the MEMS mirror 1, or the like via, for example, wires.

The MEMS mirror 1 further includes an electromotive force monitoring coil 13, a temperature monitoring resistor (temperature monitoring element) 14, wires 17a and 17b, wires 18a and 18b, electrode pads 23a and 23b, and electrode pads 24a and 24b. In FIG. 2, for the convenience of description, the electromotive force monitoring coil 13 and the temperature monitoring resistor 14 are illustrated by a broken line and the wires 17a and 17b and the wires 18a and 18b are illustrated by a solid line.

The electromotive force monitoring coil 13 is provided to the second portion 32 of the first movable part 3. The electromotive force monitoring coil 13 is wound a plurality of times in a spiral shape in a region positioned outside the mirror 7 and inside the first drive coil 11 when viewed in the optical axis direction A. A magnetic field, which is generated by the magnet 30, acts on the electromotive force monitoring coil 13. The electromotive force monitoring coil 13 may be wound a plurality of times in a spiral shape in a region positioned outside the first drive coil 11 when viewed in the optical axis direction A.

As illustrated in FIG. 3, the electromotive force monitoring coil 13 is disposed in a groove 3b formed on a surface 3a of the first movable part 3. That is, the electromotive force monitoring coil 13 is embedded in the first movable part 3. An insulating layer 3c is provided on the surface 3a of the first movable part 3 and the inner surface of the groove 3b. A seed layer 25 is provided on the insulating layer 3c in the groove 3b. The electromotive force monitoring coil 13 is formed by, for example, a damascene method of embedding a metal material, such as copper, in the groove 3b with the insulating layer 3c and the seed layer 25 interposed between the metal material and the groove 3b. An insulating layer 26 and an insulating layer 27 are provided on the surface 3a of the first movable part 3 so as to cover the electromotive force monitoring coil 13. In the first movable part 3, grooves 27a are formed on the surface of the insulating layer 27 along the inner and outer edges of the groove 3b in which the electromotive force monitoring coil 13 is disposed.

As illustrated in FIG. 2, one end of the electromotive force monitoring coil 13 is connected to the electrode pad 23a via the wire 17a. The wire 17a is formed between the insulating layers 26 and 27 (see FIG. 3), and extends to the support 2 from the first movable part 3 through the other first connecting portion 5, the second movable part 4, and one second connecting portion 6. The electrode pad 23a is formed between the insulating layers 26 and 27 (see FIG. 3), and is exposed to the outside from an opening formed in the insulating layer 27. The wire 17a and the electrode pad 23a are integrally made of, for example, a metal material, such as tungsten, aluminum, gold, silver, copper, or an aluminum alloy. The electromotive force monitoring coil 13 and the wire 17a are connected to each other through an opening formed in the insulating layer 26.

The other end of the electromotive force monitoring coil 13 is connected to the electrode pad 23b via the wire 17b. The wire 17b is formed between the insulating layers 26 and 27 (see FIG. 3), and extends to the support 2 from the first movable part 3 through one first connecting portion 5, the second movable part 4, and the other second connecting portion 6. The electrode pad 23b is formed between the insulating layers 26 and 27 (see FIG. 3), and is exposed to the outside from an opening formed in the insulating layer 27. The wire 17b and the electrode pad 23b are integrally made of, for example, a metal material, such as tungsten, aluminum, gold, silver, copper, or an aluminum alloy. The electromotive force monitoring coil 13 and the wire 17b are connected to each other through an opening formed in the insulating layer 26. The electrode pads 23a and 23b are external terminals and are electrically connected to a control unit, which is disposed outside the MEMS mirror 1, or the like via, for example, wires.

The temperature monitoring resistor 14 is provided to the support 2. More specifically, the temperature monitoring resistor 14 is provided to the support 2 along an outer edge 2e of the support 2 when viewed in the optical axis direction A. The temperature monitoring resistor 14 is configured as a coil, and is wound a plurality of times in a spiral shape in the support 2. When viewed in the optical axis direction A, a distance between the outermost coil portion of the temperature monitoring resistor 14 and the outer edge 2e of the support 2 is shorter than a distance between the innermost coil portion of the temperature monitoring resistor 14 and an inner edge 2f of the support 2. The resistance value of the temperature monitoring resistor 14 is changed in accordance with temperature. The temperature monitoring resistor 14 is made of, for example, a metal material, such as tungsten, aluminum, gold, silver, copper, or an aluminum alloy. When viewed in the optical axis direction A, the respective electrode pads 21a, 21b, 22a, 22b, 23a, and 23b described above are provided inside the temperature monitoring resistor 14.

Figure 5:
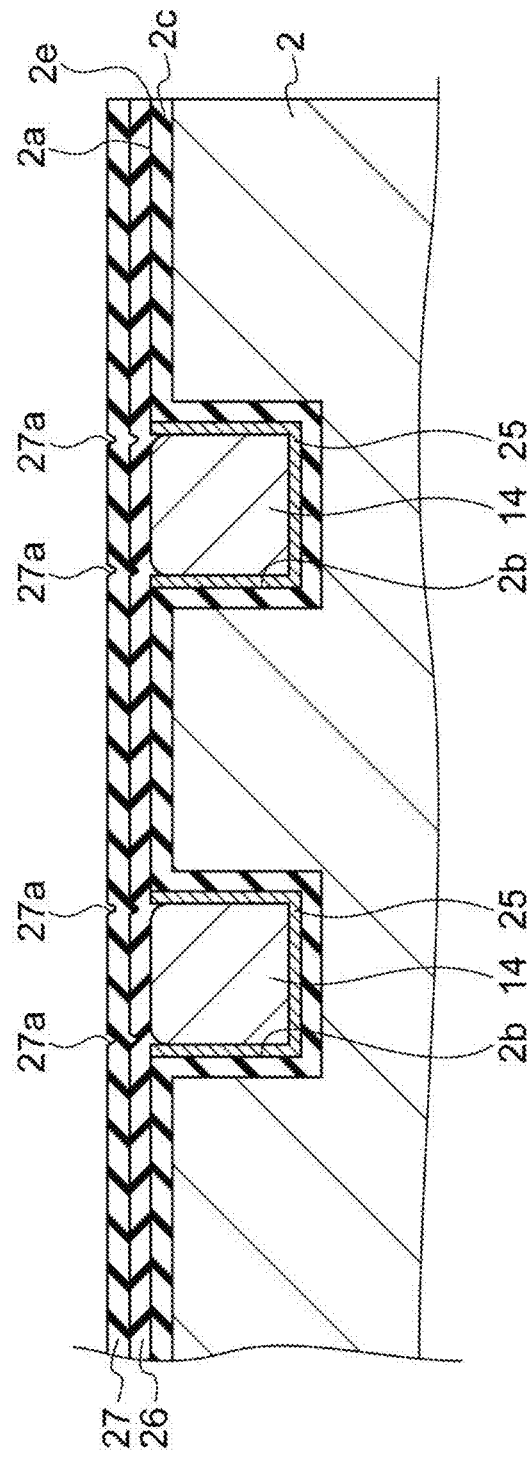
FIG. 5 is a cross-sectional view of a temperature monitoring resistor illustrated in FIG. 2 and the peripheral portion thereof.

As illustrated in FIG. 5, the temperature monitoring resistor 14 is disposed in a groove 2b formed on a surface 2a of the support 2. That is, the temperature monitoring resistor 14 is embedded in the support 2. An insulating layer 2c made of, for example, silicon oxide, silicon nitride, or the like is provided on the surface 2a of the support 2 and the inner surface of the groove 2b. A seed layer 25 is provided on the insulating layer 2c in the groove 2b. The temperature monitoring resistor 14 is formed by, for example, a damascene method of embedding a metal material, such as copper, in the groove 2b with the insulating layer 2c and the seed layer 25 interposed between the metal material and the groove 2b. The insulating layer 26 and the insulating layer 27 are provided on the surface 2a of the support 2 so as to cover the temperature monitoring resistor 14. In the support 2, grooves 27a are formed on the surface of the insulating layer 27 along the inner and outer edges of the groove 2b in which the temperature monitoring resistor 14 is disposed.

As illustrated in FIG. 2, one end of the temperature monitoring resistor 14 is connected to the electrode pad 24a via the wire 18a. The wire 18a is formed between the insulating layers 26 and 27 (see FIG. 5). The electrode pad 24a is formed between the insulating layers 26 and 27 (see FIG. 5), and is exposed to the outside from an opening formed in the insulating layer 27. The wire 18a and the electrode pad 24a are integrally made of, for example, a metal material, such as tungsten, aluminum, gold, silver, copper, or an aluminum alloy. The temperature monitoring resistor 14 and the wire 18a are connected to each other through an opening formed in the insulating layer 26.

The other end of the temperature monitoring resistor 14 is connected to the electrode pad 24b via the wire 18b. The wire 18b is formed between the insulating layers 26 and 27 (see FIG. 5. The electrode pad 24b is formed between the insulating layers 26 and 27 (see FIG. 5), and is exposed to the outside from an opening formed in the insulating layer 27. The wire 18b and the electrode pad 24b are integrally made of, for example, a metal material, such as tungsten, aluminum, gold, silver, copper, or an aluminum alloy. The temperature monitoring resistor 14 and the wire 18b are connected to each other through an opening formed in the insulating layer 26.

As illustrated in FIG. 1, the support 2 of the MEMS mirror 1 is thermally connected to the magnet 30 via the base 41 of the package 40. Since the first and second movable parts 3 and 4 of the MEMS mirror 1 are supported by the support 2 in a state where a space is formed between the base 41 and the first and second movable parts 3 and 4 of the MEMS mirror 1 and intervals are formed between the support 2 and the first and second movable parts 3 and 4 of the MEMS mirror 1, the first and second movable parts 3 and 4 of the MEMS mirror 1 are thermally isolated from the magnet 30 as compared to the support 2. A recessed portion 41c is formed on the inner surface 41a of the base 41 so as to face the first and second movable parts 3 and 4. The surfaces of the support 2, the first movable part 3, and the second movable part 4 facing the window member 43 are flush with each other, and the first drive coil 11, the second drive coil 12, the electromotive force monitoring coil 13, and the temperature monitoring resistor 14 are arranged along the same plane (the surfaces of the support 2, the first movable part 3, and the second movable part 4 facing the window member 43) (see FIG. 2).

Other examples where the support 2 is thermally connected to the magnet 30 may include a case where the support 2 is directly connected to the magnet 30 and a case where the support 2 is connected to the magnet 30 via a member having a thermal conductivity higher than the thermal conductivity of air. Other examples may include a case where the magnet 30, the support 2, and the temperature monitoring resistor 14 are stacked in this order and are arranged on a straight line. In this embodiment, the support 2 and the magnet 30 are disposed so as to overlap with each other when viewed in the optical axis direction A. However, the support 2 and the magnet 30 may be disposed not to overlap with each other. For example, the magnet 30 may be disposed on the base 41 so as to be positioned between the side wall 42 and the support 2. Even in this case, the support 2 is thermally connected to the magnet 30 via the base 41. Alternatively, the magnet 30 may be provided on the base 41 so as to be positioned between the side wall 42 and the support 2 and be in contact with the support 2. In this case, the support 2 is thermally connected to the magnet 30 by contacting with the magnet 30. Alternatively, the magnet 30 may be provided on the base 41 so as to be positioned outside the side wall 42 (on the side opposite to the MEMS mirror 1 with respect to the side wall 42). In this case, the support 2 is thermally connected to the magnet 30 via the base 41. In this embodiment, the support 2 formed in, for example, a rectangular frame shape is supported by the base 41 at four sides thereof. However, the support 2 may be supported by the base 41 at least two sides thereof, and may be supported by the base 41 at, for example, only two side thereof facing each other. That is, the recessed portion 41c may be formed to reach the lower sides of two side portions of the support 2.

Figure 6:
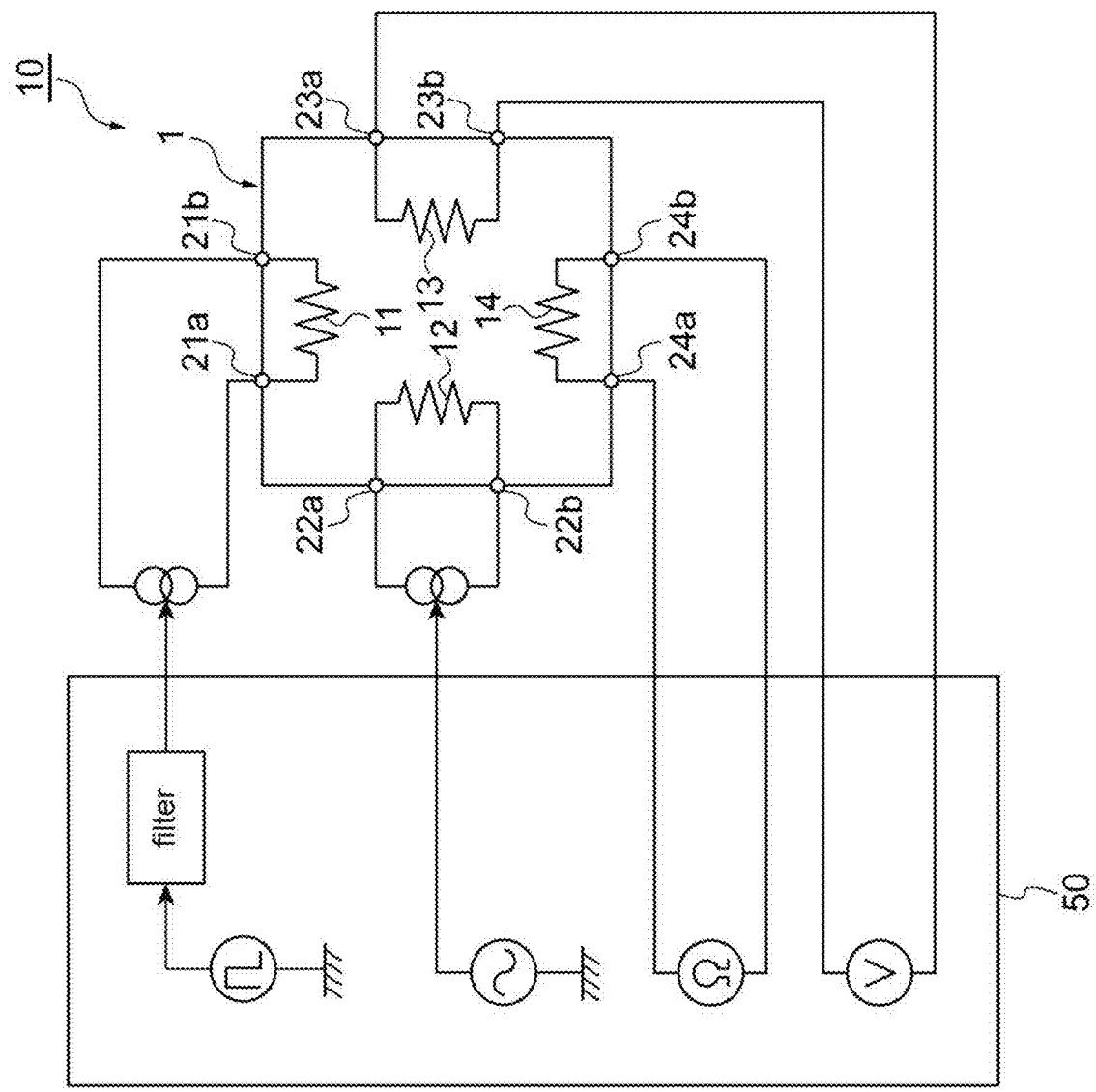
FIG. 6 is a diagram illustrating the configuration of the optical module of the embodiment.

The operation of the optical module 10 will be described. As illustrated in FIG. 6, a control unit 50 is electrically connected to the MEMS mirror 1 in the optical module 10.

The control unit 50 applies high-frequency drive current to the first drive coil 11. In this case, since a magnetic field generated by the magnet 30 acts on the first drive coil 11, the Lorentz force is generated on the first drive coil 11. Accordingly, the first movable part 3 is made to swing about the first axis X1, for example, at the level of a resonant frequency.

The drive current applied to the first drive coil 11 passes through a filter including a capacitor, so that the wave of the drive current is converted into a square wave illustrated in FIG. 7(b) from a square wave illustrated in FIG. 7(a). When a square wave including steep rises as illustrated in FIG. 7(a) is applied to the first drive coil 11 as drive current, there is a concern that an unnecessary operation or crosstalk to the second drive coil 12, the electromotive force monitoring coil 13, and the like may be caused by frequency components other than a target frequency component. A square wave including blunted rises so as to have delays as illustrated in FIG. 7(b) is applied to the first drive coil 11 as drive current, so that the occurrence of such a problem is suppressed.

Further, the control unit 50 applies drive current having a constant magnitude to the second drive coil 12. In this case, since a magnetic field generated by the magnet 30 acts on the second drive coil 12, the Lorentz force is generated on the second drive coil 12. Accordingly, the second movable part 4 is rotated about the second axis X2 in accordance with, for example, the magnitude of the drive current, and is stopped in that state.

Furthermore, the control unit 50 controls the drive current, which is to be applied to the first drive coil 11, based on the resistance value of the temperature monitoring resistor 14 and an electromotive force generated on the electromotive force monitoring coil 13. The reason for this is as follows.

In a case where the magnetic flux density of a magnetic field generated by the magnet 30 is denoted by B (T), the number of times of winding of the electromotive force monitoring coil 13 is denoted by n, the length of the electromotive force monitoring coil 13 in a direction to which the magnetic field is orthogonal is denoted by l (m), and the speed of the electromotive force monitoring coil 13 is denoted by v (m/s), the maximum electromotive force E (V) to be generated on the electromotive force monitoring coil 13, when the first movable part 3 resonates in a steady state in the MEMS mirror 1, is represented by "E=nvBl". Further, in a case where the radius of rotation of the electromotive force monitoring coil 13 is denoted by r (m), the angular frequency of the electromotive force monitoring coil 13 is denoted by $\omega$ ($s^{-1}$), and the maximum deflection angle (amplitude) of the electromotive force monitoring coil 13 is denoted by θ (rad), the speed v (m/s) of the electromotive force monitoring coil 13 is represented by "v=rωθ". A relationship between the maximum electromotive force E and the maximum deflection angle θ is represented by "E=nBlrωθ" from the above-mentioned two equations. Since a change in each of an electromotive force, which is generated on the electromotive force monitoring coil 13, and the deflection angle of the electromotive force monitoring coil 13 with respect to time has a sine wave shape, attention is paid to the maximum values of these (that is, the maximum electromotive force E and the maximum deflection angle θ) here.

Accordingly, in a case where the number n of times of winding, the magnetic flux density B, the length 1, the radius r of rotation, and the angular frequency ω are constant, the maximum deflection angle θ of the electromotive force monitoring coil 13, that is, the maximum deflection angle of the mirror 7 can be acquired through the monitoring of the maximum electromotive force E generated on the electromotive force monitoring coil 13. However, actually, the magnetic flux density B of a magnetic field generated by the magnet 30 is changed in accordance with the temperature of the magnet 30. For this reason, the maximum deflection angle of the mirror 7 cannot be accurately acquired if the temperature of the magnet 30 is not considered.

Accordingly, the control unit 50 controls drive current to be applied to the first drive coil 11 as follows based on the resistance value of the temperature monitoring resistor 14 and an electromotive force generated on the electromotive force monitoring coil 13.

It is premised that the control unit 50 acquires a relationship between the temperature and the resistance value of the temperature monitoring resistor 14 as illustrated in FIG. 8(a) in advance and stores the relationship. Further, the control unit 50 acquires a relationship between the deflection angle and the electromotive force of the electromotive force monitoring coil 13 at each temperature of the temperature monitoring resistor 14 as illustrated in FIG. 8(b) in advance and stores the relationship. In the optical module 10, the temperature monitoring resistor 14 of which the resistance value is changed in accordance with temperature is provided to the support 2 thermally connected to the magnet 30. Accordingly, the temperature of the temperature monitoring resistor 14 reflects the temperature of the magnet 30. A case where the temperature of the temperature monitoring resistor 14 reflects the temperature of the magnet 30 means that the temperature of the temperature monitoring resistor 14 follows the temperature of the magnet 30 in accordance with a predetermined relationship (for example, in accordance with a predetermined difference in temperature) without being limited to a case where the temperature of the temperature monitoring resistor 14 is the same as the temperature of the magnet 30.

Figure 9:
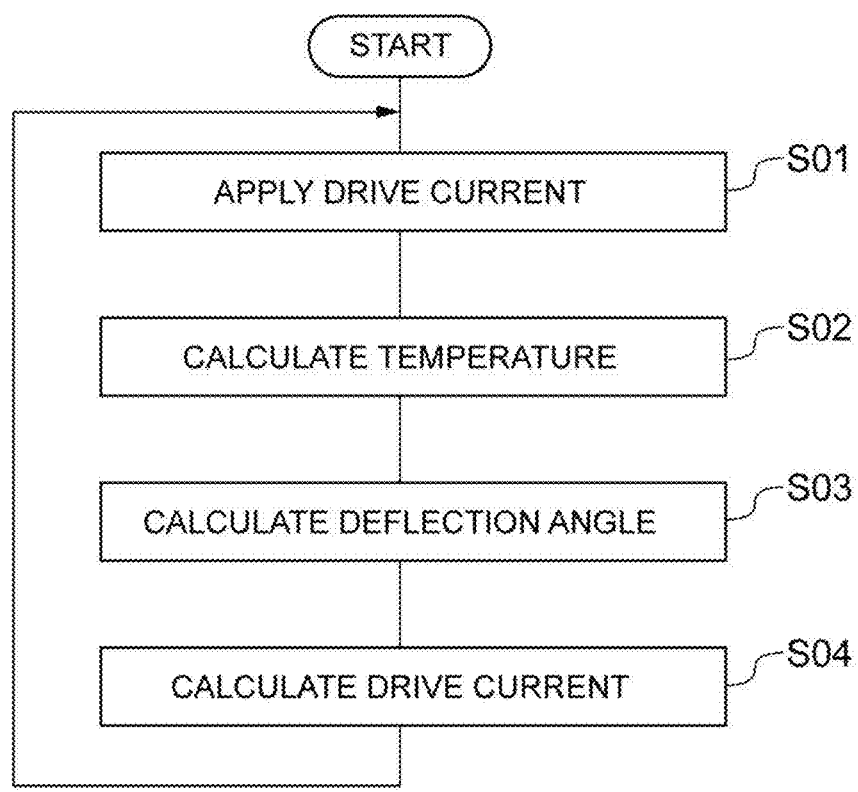
FIG. 9 is a flow chart illustrating the feedback control of drive current performed in the optical module illustrated in FIG. 6.

After storing the respective relationships having been described above, the control unit 50 performs the feedback control of drive current to be applied to the first drive coil 11 according to a flow chart illustrated in FIG. 9. First, the control unit 50 applies high-frequency drive current to the first drive coil 11 (Step S01). Accordingly, the first movable part 3 is made to swing about the first axis X1, for example, at a resonant frequency level.

After that, the control unit 50 acquires the resistance value of the temperature monitoring resistor 14 and calculates the temperature of the temperature monitoring resistor 14 based on the acquired resistance value (Step S02). Specifically, the control unit 50 calculates the temperature of the temperature monitoring resistor 14 based on a relationship between the temperature and the resistance value of the temperature monitoring resistor 14. For example, as illustrated in FIG. 8(a), the temperature of the temperature monitoring resistor 14 is $T_1$ when the resistance value of the temperature monitoring resistor 14 is $R_1$.

After that, the control unit 50 acquires an electromotive force generated on the electromotive force monitoring coil 13, and calculates the deflection angle of the electromotive force monitoring coil 13 based on the acquired electromotive force (Step S03). Specifically, the control unit 50 calculates the deflection angle of the electromotive force monitoring coil 13 based on a relationship between the deflection angle and the electromotive force of the electromotive force monitoring coil 13. For example, as illustrated in FIG. 8(b), the deflection angle of the electromotive force monitoring coil 13 is $\theta_1$ when an electromotive force generated on the electromotive force monitoring coil 13 is $V_1$ when the temperature calculated in Step S02 is $T_1$.

After that, the control unit 50 calculates drive current to be applied to the first drive coil 11 based on a difference between the deflection angle calculated in Step S02 and a deflection angle to be actually given (Step S04). Then, the control unit 50 applies drive current to the first drive coil 11 at the value of calculated drive current (specifically, the magnitude of the amplitude of the square wave illustrated in FIGS. 7(a) and 7(b)). Accordingly, even though the magnetic flux density of a magnetic field generated by the magnet 30 is changed in accordance with the temperature of the magnet 30, the mirror 7 is made to swing about the first axis X1 at a deflection angle to be actually given.

As described above, in the optical module 10, the temperature monitoring resistor 14 of which the resistance value is changed in accordance with temperature is provided to the support 2 thermally connected to the magnet 30. Accordingly, the temperature of the temperature monitoring resistor 14 reflects the temperature of the magnet 30, compared with a case where, for example, the temperature monitoring resistor 14 is provided to the first movable part 3 together with the first drive coil 11 and the electromotive force monitoring coil 13. The reason for this is that the temperature monitoring resistor 14 is affected by heat generated from the first drive coil 11 and the electromotive force monitoring coil 13 and a space formed between the first movable part 3 and the magnet 30 (more specifically, a space formed between the first movable part 3 and the base 41 of the package 40) serves as a thermal resistor in a case where, for example, the temperature monitoring resistor 14 is provided to the first movable part 3 together with the first drive coil 11 and the electromotive force monitoring coil 13. Accordingly, according to the optical module 10, information about the deflection angle of the mirror 7 (including the deflection angle of the mirror 7, the speed of the mirror 7, and the like) can be accurately acquired in consideration of the magnetic flux density of the magnet 30, which changes in accordance with the temperature of the magnet 30, based on the resistance value of the temperature monitoring resistor 14 and an electromotive force generated on the electromotive force monitoring coil 13. Further, the deflection angle of the mirror 7 can be accurately controlled based on the resistance value of the temperature monitoring resistor 14.

The thermal conductivity of the support 2 is higher (preferably 100 or more times higher) than the thermal conductivity of air. Likewise, the thermal conductivity of the base 41 is higher (preferably 100 or more times higher) than the thermal conductivity of air. Further, even in a case where the support 2 is mounted on the inner surface 41a of the base 41 with a resin, the conduction of heat is hardly affected by the resin since the thickness of the resin is very small, for example, about several tens of μm. Likewise, even in a case where the magnet 30 is mounted on the outer surface 41b of the base 41 with a resin, the conduction of heat is hardly affected by the resin since the thickness of the resin is very small, for example, about several tens of μm. That is, in the optical module 10, the temperature of the magnet 30 is more directly detected than a case where the temperature of the magnet 30 is detected through an air layer.

Further, in the optical module 10, the first movable part 3 is connected to the second movable part 4 so as to be swingable about the first axis X1 and the second movable part 4 is connected to the support 2 so as to be swingable about second axis X2. Accordingly, the mirror 7 can be made to swing about the first axis X1 and about the second axis X2.

Furthermore, the temperature monitoring resistor 14 is configured as a coil in the optical module 10. Accordingly, the temperature monitoring resistor 14 having a length sufficient to detect a change in a resistance value can be realized in a limited region.

Moreover, in the optical module 10, the support 2 is formed in a frame shape so as to surround the first movable part 3 when viewed in the optical axis direction A. Accordingly, the stable support of the first movable part 3 can be realized.

Further, in the optical module 10, the temperature monitoring resistor 14 is provided to the support 2 along the outer edge 2e of the support 2 when viewed in the optical axis direction A. Accordingly, it is more difficult for the temperature monitoring resistor 14 to be affected by heat generated from the first drive coil 11 and the electromotive force monitoring coil 13. Furthermore, it is easier to ensure the length of the temperature monitoring resistor 14 sufficient to detect a change in a resistance value.

Moreover, in the optical module 10, the first drive coil 11, the second drive coil 12, the electromotive force monitoring coil 13, and the temperature monitoring resistor 14 are arranged along the same plane. Accordingly, the first drive coil 11, the second drive coil 12, the electromotive force monitoring coil 13, and the temperature monitoring resistor 14 can be easily formed in a case where the MEMS mirror 1 is to be manufactured by semiconductor manufacturing processes.

Further, the first drive coil 11 is embedded in the first movable part 3 in the optical module 10. Accordingly, since the resistance value of the first drive coil 11 can be reduced by an increase in the cross-sectional area of the first drive coil 11, the power consumption of the first drive coil 11 can be reduced.

Furthermore, the second drive coil 12 is embedded in the second movable part 4 in the optical module 10. Accordingly, since the resistance value of the second drive coil 12 can be reduced by an increase in the cross-sectional area of the second drive coil 12, the power consumption of the second drive coil 12 can be reduced.

Moreover, the electromotive force monitoring coil 13 is embedded in the first movable part 3 in the optical module 10. Accordingly, since the resistance value of the electromotive force monitoring coil 13 can be reduced by an increase in the cross-sectional area of the electromotive force monitoring coil 13, noise at the time of generation of crosstalk in the electromotive force monitoring coil 13 can be reduced.

Further, the temperature monitoring resistor 14 is embedded in the support 2 in the optical module 10. Accordingly, the temperature of the temperature monitoring resistor 14 more accurately reflects the temperature of the magnet 30.

Furthermore, in the optical module 10, the support 2 is mounted on the inner surface 41a of the base 41 of the package 40 and the magnet 30 is mounted on the outer surface 41b of the base 41 of the package 40 so as to face the first and second movable parts 3 and 4. Accordingly, the configuration of the optical module 10 can be simplified while the MEMS mirror 1 can be protected from the outside.

Moreover, in the optical module 10, the recessed portion 41c is formed on the inner surface 41a of the base 41 of the package 40 so as to face the first and second movable parts 3 and 4. Accordingly, since the thickness of the support 2 can be reduced while physical interference between the first and second movable parts 3 and 4 and the base 41 can be prevented, the temperature of the temperature monitoring resistor 14 more accurately reflects the temperature of the magnet 30. Considering the conduction of heat, the thickness of the support 2 is preferably 1 mm or less and more preferably 600 μm.

Further, in the optical module 10, the control unit 50 controls drive current to be applied to the first drive coil 11 based on the resistance value of the temperature monitoring resistor 14 and the electromotive force generated on the electromotive force monitoring coil 13. Accordingly, the mirror 7 can be made to swing at a desired deflection angle.

Furthermore, in the optical module 10, the width of the support 2 is larger than the width of the first connecting portion 5 when viewed in the optical axis direction A. Accordingly, since it is easy for the support 2 to transfer heat, the temperature of the temperature monitoring resistor 14 more accurately reflects the temperature of the magnet 30. Moreover, since the width of the first connecting portion 5 is smaller than the width of the support 2, it is difficult for heat, which is generated from the first drive coil 11, to be transferred to the support 2 through the first connecting portions 5 and the second movable part 4. Accordingly, the temperature of the temperature monitoring resistor 14 more accurately reflects the temperature of the magnet 30.

Further, in the optical module 10, the width of the support 2 is larger than the width of the second connecting portion 6 when viewed in the optical axis direction A. Accordingly, since it is easy for the support 2 to transfer heat, the temperature of the temperature monitoring resistor 14 more accurately reflects the temperature of the magnet 30. Furthermore, since the width of the second connecting portion 6 is smaller than the width of the support 2, it is difficult for heat, which is generated from the second drive coil 12, to be transferred to the support 2 through the second connecting portions 6. Accordingly, the temperature of the temperature monitoring resistor 14 more accurately reflects the temperature of the magnet 30.

Moreover, in the optical module 10, the electrode pads 21a, 21b, 22a, and 22b provided to the support 2 are provided inside the temperature monitoring resistor 14 when the electrode pads 21a, 21b, 22a, and 22b are viewed in the optical axis direction A. Accordingly, since it is possible to avoid a situation where the wires 15a, 15b, 16a, and 16b connected to the electrode pads 21a, 21b, 22a, and 22b cross the temperature monitoring resistor 14, the transfer of the heat of the wires 15a, 15b, 16a, and 16b to the temperature monitoring resistor 14 can be suppressed. In this embodiment, a plurality of wires connected to the electrode pads 21a, 21b, 22a, and 22b cross the temperature monitoring resistor 14, but air is interposed between the wires and the temperature monitoring resistor 14. Accordingly, the transfer of the heat of the wires to the temperature monitoring resistor 14 is suppressed.

Further, in the optical module 10, the thickness of the base 41 in the optical axis direction A is smaller than a distance between the side wall 42 and the support 2 when viewed in the optical axis direction A. Accordingly, since it is easy for the heat of the magnet 30 to be transferred to the support 2 through the base 41 but it is difficult for heat to be transferred to the support 2 from the side wall 42, the temperature of the temperature monitoring resistor 14 more accurately reflects the temperature of the magnet 30.

Figure 10:
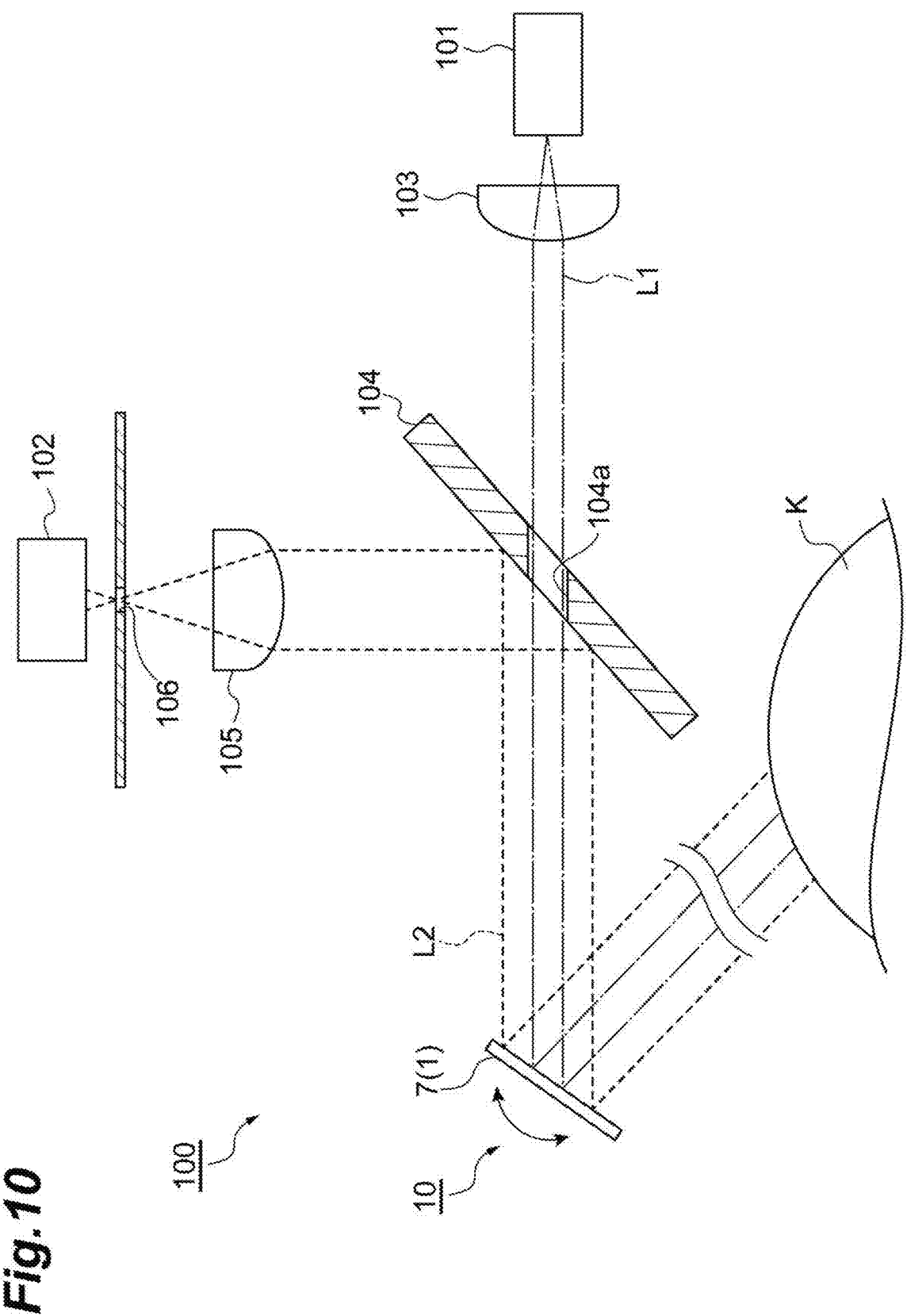
FIG. 10 is a diagram illustrating the configuration of a distance measurement device of an embodiment.

The optical module 10 having the above-mentioned configuration can be applied to a distance measurement device 100 as illustrated in FIG. 10. The distance measurement device 100 is a device mounted on, for example, a vehicle, such as an automobile, as an automatic drive support system. In the automatic drive support system, a distance between a vehicle, which is traveling, and an object K is measured in real time by the distance measurement device 100 and the speed of the vehicle and the like are controlled based on a measurement result. As a result, control for avoiding a collision between the vehicle and the object K is performed. The object K is, for example, another vehicle, an obstacle, such as a wall, a pedestrian, or the like.

When the optical module 10 is applied to an in-vehicle distance measurement device 100, an operating environment temperature is significantly changed and the temperature of the magnet 30 is significantly changed due to a change in the operating environment temperature. For this reason, there is a concern that the accuracy of information about the deflection angle of the mirror 7 may significantly deteriorate. However, since the mirror 7 can be made to swing at a desired deflection angle in the optical module 10 regardless of a change in the operating environment temperature as described above, the highly accurate measurement of a distance can be realized in the distance measurement device 100.

The configuration of the distance measurement device 100 will be described below. The distance measurement device 100 includes the optical module 10, a light source 101 that emits laser light, and a photodetector 102 that detects laser light through the object K and the mirror 7. Laser light L1, which is emitted from the light source 101, is collimated by a collimating lens 103, and is reflected by the mirror 7 of the optical module 10 through a pinhole 104a formed in a reflective mirror 104. The object K is scanned with the reflected laser light L1 through the oscillation of the mirror 7. Return light L2 from the object K is sequentially reflected by the mirror 7 of the optical module 10 and the reflective mirror 104 and is focused by a condenser lens 105. The focused return light L2 is incident on the photodetector 102 through an aperture 106, and is detected by the photodetector 102. An output signal from the photodetector 102 is output to a calculation unit (not illustrated). In the calculation unit, a distance to the object K is calculated based on a time-of-flight (TOF) method.

One embodiment of the invention has been described above, but the invention is not limited to the embodiment. For example, as in a first modification illustrated in FIG. 11(a), the MEMS mirror 1 may not include the second movable part 4, the pair of second connecting portions 6, and the second drive coil 12 in the embodiment. In the first modification, the first movable part 3 is connected to the support 2 via the pair of first connecting portions 5 so as to be swingable about the first axis X1. The pair of first connecting portions 5 connects the first movable part 3 to the support 2 so that the first movable part 3 can swing about the first axis X1. For the relief of stress acting on the first connecting portions 5, the width of an end portion of each first connecting portion 5 close to the first movable part 3 is increased as it approaches the first movable part 3. In the first modification, an end portion of each first connecting portion 5 opposite to the first movable part 3 has a constant width. However, for the further relief of stress acting on the first connecting portions 5, the width of the end portion of each first connecting portion 5 opposite to the first movable part 3 may be increased as it is away from the first movable part 3. In a case where each first connecting portions 5 is provided with a widened portion (stress-relieving portion) as described above, the width of the first connecting portion 5 is the width (maximum width) of a portion of the first connecting portion 5 other than the widened portion. At least one end portion of each second connecting portion 6 may be provided with a widened portion likewise. In this case, the width of the second connecting portion 6 is the width (maximum width) of a portion of the second connecting portion 6 other than the widened portion.

The first movable part 3 is made to swing about the first axis X1, for example, at a resonant frequency level. According to the first modification, as in the embodiment, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the electromotive force monitoring coil 13. The first drive coil 11, the electromotive force monitoring coil 13, and the temperature monitoring resistor 14 are simply illustrated in FIG. 11(a).

Likewise, the first drive coil 11, the second drive coil 12, the electromotive force monitoring coil 13, and the temperature monitoring resistor 14 are simply illustrated even in FIGS. 11(b) to 15(b) to be described later.

As in a second modification illustrated in FIG. 11(b), the MEMS mirror 1 may not include the second drive coil 12 in the embodiment. In the second modification, the first movable part 3 is made to swing about the first axis X1, for example, at a resonant frequency level. The second movable part 4 is not made to swing. According to the second modification, as in the embodiment, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the electromotive force monitoring coil 13.

As in a third modification illustrated in FIG. 12(a), the MEMS mirror 1 may not include the electromotive force monitoring coil 13 in the first modification. In the third modification, not an electromotive force generated on the electromotive force monitoring coil 13 but an electromotive force (counter-electromotive force) generated on the first drive coil 11 is used for the control of drive current to be applied to the first drive coil 11. That is, the first drive coil 11 is used for the monitoring of an electromotive force. The control unit 50 controls drive current to be applied to the first drive coil 11 based on the resistance value of the temperature monitoring resistor 14 and an electromotive force generated on the first drive coil 11. According to the third modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the first drive coil 11.

Figure 12:
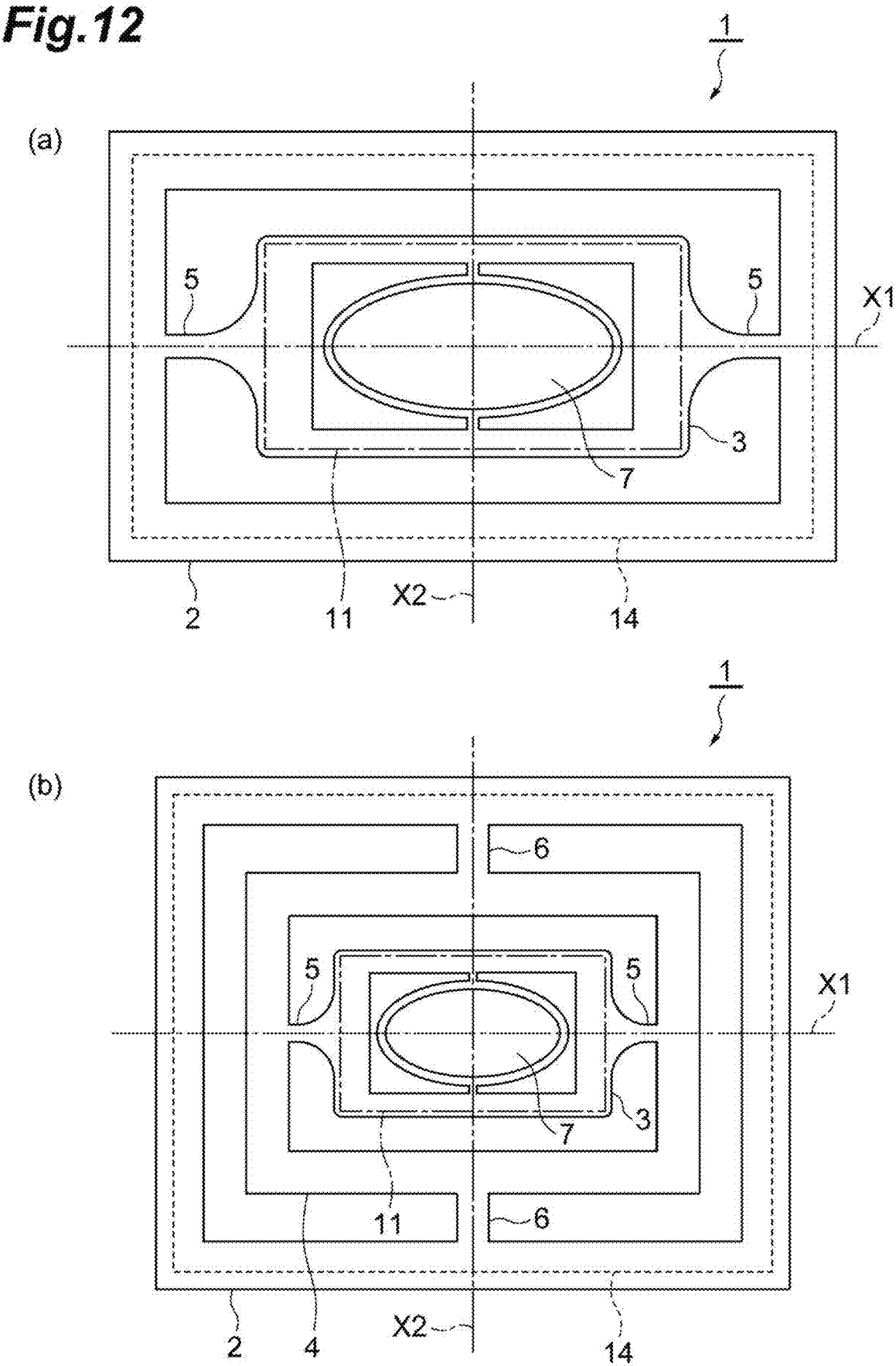
FIG. 12(a) is a schematic plan view of a MEMS mirror of a third modification.
FIG. 12(b) is a schematic plan view of a MEMS mirror of a fourth modification.

As in a fourth modification illustrated in FIG. 12(*b*), the MEMS mirror 1 may not include the electromotive force monitoring coil 13 in the second modification. In the fourth modification, not an electromotive force generated on the electromotive force monitoring coil 13 but an electromotive force generated on the first drive coil 11 is used for the control of drive current to be applied to the first drive coil 11. That is, the first drive coil 11 is used for the monitoring of an electromotive force. The control unit 50 controls drive current to be applied to the first drive coil 11 based on the resistance value of the temperature monitoring resistor 14 and an electromotive force generated on the first drive coil 11. According to the fourth modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the first drive coil 11.

As in a fifth modification illustrated in FIG. 13(*a*), the MEMS mirror 1 may not include the first drive coil 11 in the embodiment. In other words, the first drive coil 11 is not provided to the first movable part 3 and a drive coil (second drive coil 12) is provided to only the second movable part 4 in the fifth modification. The resonance of the first movable part 3 at a resonant frequency is used in the fifth modification, so that the first movable part 3 is made to swing about the first axis X1 at a resonant frequency level by the Lorentz force generated on the second drive coil 12. Specifically, when a drive signal having a frequency equal to the resonant frequency of the first movable part 3 about the first axis X1 is input to the second drive coil 12, the second movable part 4 slightly vibrates about the first axis X1 at the frequency. This vibration is transmitted to the first movable part 3 through the first connecting portions 5, so that the first movable part 3 can be made to swing about the first axis X1 at the frequency. In the same manner as the case of the embodiment, the second movable part 4 is made to swing (rotate) about the second axis X2. That is, two signals of a signal, which makes the first movable part 3 swing about the first axis X1 by vibrating the second movable part 4, and a signal, which makes the second movable part 4 swing about the second axis X2, are input to the second drive coil 12. According to the fifth modification, as in the embodiment, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the electromotive force monitoring coil 13. In the fifth modification, a pair of second drive coils 12 may be provided to the second movable part 4. In this case, a signal, which makes the first movable part 3 swing about the first axis X1 by vibrating the second movable part 4, is input to one second drive coil 12 and a signal, which makes the second movable part 4 swing about the second axis X2, is input to the other second drive coil 12.

As in a sixth modification illustrated in FIG. 13(*b*), the electromotive force monitoring coil 13 may be provided to the second movable part 4 in the fifth modification. According to the fifth modification, as in the embodiment, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the electromotive force monitoring coil 13. That is, since the first movable part 4 is made to swing about the first axis X1 by the vibration of the second movable part 4 in the fifth modification, it is possible to acquire information about the deflection angle of the first movable part 4 by monitoring an electromotive force, which is generated on the electromotive force monitoring coil 13, through the vibration of the second movable part 4.

As in a seventh modification illustrated in FIG. 14(*a*), the MEMS mirror 1 may not include the electromotive force monitoring coil 13 in the sixth modification. In the seventh modification, not an electromotive force generated on the electromotive force monitoring coil 13 but an electromotive force generated on the second drive coil 12 is used for the control of drive current to be applied to the second drive coil 12. That is, the second drive coil 12 is used for the monitoring of an electromotive force. The control unit 50 controls drive current to be applied to the second drive coil 12 based on the resistance value of the temperature monitoring resistor 14 and an electromotive force generated on the second drive coil 12. According to the seventh modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the second drive coil 12.

As in an eighth modification illustrated in FIG. 14(*b*), the MEMS mirror 1 may not include the first drive coil 11 in the embodiment. In the eighth modification, the second movable part 4 is connected to the support 2 so that the first movable part 3 is swingable about the first axis X1 by the vibration of the second movable part 4. That is, the pair of second connecting portions 6 connects the second movable part 4 to the support 2 so that the first movable part 3 is swingable about the first axis X1 by the vibration of the second movable part 4. In the eighth modification, the second movable part 4 is not swingable about the second axis X2. The resonance of the first movable part 3 at a resonant frequency is used in the eighth modification as in the fifth modification, so that the first movable part 3 is swing about the first axis X1 at a resonant frequency level by the Lorentz force generated on the second drive coil 12. According to the eighth modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the second drive coil 12.

As in a ninth modification illustrated in FIG. 15(*a*), the electromotive force monitoring coil 13 may be provided to the second movable part 4 in the eighth modification. According to the ninth modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the second drive coil 12.

As in a tenth modification illustrated in FIG. 15(*b*), the MEMS mirror 1 may not include the electromotive force monitoring coil 13 in the ninth modification. In the tenth modification, not an electromotive force generated on the electromotive force monitoring coil 13 but an electromotive force generated on the second drive coil 12 is used for the control of drive current to be applied to the second drive coil 12. That is, the second drive coil 12 is used for the monitoring of an electromotive force. The control unit 50 controls drive current to be applied to the second drive coil 12 based on the resistance value of the temperature monitoring resistor 14 and an electromotive force generated on the second drive coil 12. According to the tenth modification, information about the deflection angle of the mirror 7 can be accurately acquired in consideration of the magnetic flux density of the magnet 30, which changes in accordance with the temperature of the magnet 30, based on the resistance value of the temperature monitoring resistor 14 and an electromotive force generated on the second drive coil 12. In the eighth to tenth modifications, the width of the support 2 is smaller than the width of each second connecting portion 6 when viewed in the optical axis direction A. However, the width of the support 2 may be larger than the width of each second connecting portion 6.

As another modification, the control unit 50 may control drive current to be applied to the second drive coil 12 based on the resistance value of the temperature monitoring resistor 14 in the embodiment. The control unit 50 may control drive current to be applied to the second drive coil 12 based on the resistance value of the temperature monitoring resistor 14 in addition to controlling drive current to be applied to the first drive coil 11 based on the resistance value of the temperature monitoring resistor 14. Alternatively, the control unit 50 may control drive current to be applied to the second drive coil 12 based on the resistance value of the temperature monitoring resistor 14 without controlling drive current to be applied to the first drive coil 11 based on the resistance value of the temperature monitoring resistor 14. The reason why the control unit 50 controls drive current to be applied to the second drive coil 12 based on the resistance value of the temperature monitoring resistor 14 is as follows.

As described above, drive current having a constant magnitude is applied to the second drive coil 12, so that the second movable part 4 is rotated about the second axis X2. When the second movable part 4 is to be linearly driven in this way, torque T (Nm) to act on the second movable part 4 is represented by "T=kγ" from Hooke's law in a case where the spring constant of the second connecting portion 6 is denoted by k (Nm/rad) and the deflection angle of the second movable part 4 is denoted by γ (rad). Meanwhile, in a case where a length between the center of rotation and a material point is denoted by R (m), the Lorentz force is denoted by F (N), drive current to be applied to the second drive coil 12 is denoted by I (A), the magnetic flux density of a magnetic field generated by the magnet 30 is denoted by B (T), and the length of the second drive coil 12 in a direction to which the magnetic field is orthogonal is denoted by L (m), torque T is represented by "T=RF=RIBL". The deflection angle γ is represented by "γ=RIBL/k" from the above-mentioned two equations. Accordingly, the deflection angle γ is proportional to the drive current I and the magnetic flux density B.

As described above, the magnetic flux density B changes in accordance with the temperature of the magnet 30. For this reason, the control unit 50 performs the feedback control of drive current to be applied to the second drive coil 12 based on the resistance value of the temperature monitoring resistor 14. Specifically, the control unit 50 acquires a relationship between the drive current and the deflection angle of the second drive coil 12 at each temperature of the temperature monitoring resistor. 14 in advance and stores the relationship. The control unit 50 calculates the deflection angle γ of the second movable part 4 based on the temperature of the temperature monitoring resistor 14 calculated based on the resistance value of the temperature monitoring resistor 14 and a relationship between the drive current and the deflection angle of the second drive coil 12. According to the above-mentioned modification, information about the deflection angle γ of the second movable part 4, that is, the deflection angle of the mirror 7 can be accurately acquired in consideration of the magnetic flux density of the magnet 30, which changes in accordance with the temperature of the magnet 30, based on the resistance value of the temperature monitoring resistor 14. The spring constant k is also changed in accordance with temperature, but the influence of a change in the spring constant k is much smaller than that of a change in the magnetic flux density B.

High-frequency drive current is applied to the first drive coil 11 in the embodiment, so that the first movable part 3 is made to swing about the first axis X1 at a resonant frequency level. In the case of this nonlinear drive, unlike in the case of linear drive, torque acting on the first movable part 3 has a value in which the product of the spring constant of the first connecting portion 5 and the deflection angle of the first movable part 3 is multiplied with a so-called Q value. The Q value is a parameter depending on the viscosity of air and the viscosity of a material, and has high nonlinearity. Accordingly, to accurately acquire information about the deflection angle of the mirror 7, an electromotive force generated on the electromotive force monitoring coil 13 or an electromotive force generated on the first drive coil 11 is used for the control of drive current to be applied to the first drive coil 11 as described above.

The material and shape of each component are not limited to the above-mentioned material and shape, and various materials and shapes can be employed. The temperature monitoring resistor 14 is configured as a coil, but the shape of the temperature monitoring resistor 14 is not limited as long as the length of the temperature monitoring resistor 14 sufficient to detect a change in a resistance value can be ensured. For example, the temperature monitoring resistor 14 may be formed in the support 2 so as to extend in a meandering shape (zigzag shape). The optical module 10 may not be provided with the package 40, and the support 2 of the MEMS mirror 1 may be mounted on the magnet 30. The optical module 10 may not be provided with the second movable part 4, the second drive coil 12, and the like, and the mirror 7 may swing about only the first axis X1. As long as the magnet 30 can generate a magnetic field acting on the MEMS mirror 1 and is thermally connected to the support 2, the arrangement of the magnet 30 is not limited.

A temperature monitoring element other than the temperature monitoring resistor 14 may be provided to the support 2. For example, a thermocouple and the like can be used as the temperature monitoring element other than the temperature monitoring resistor 14. In a case where the temperature monitoring element is disposed to contact with the support 2, the temperature of the temperature monitoring element reflects the temperature of the magnet 30. Accordingly, information about the deflection angle of the mirror 7 can be accurately acquired in consideration of the magnetic flux density of the magnet 30, which changes in accordance with the temperature of the magnet 30, based on the detection value of the temperature monitoring element (a thermal electromotive force in the case of the thermocouple) and an electromotive force generated on the electromotive force monitoring coil 13.

The first drive coil 11 may be formed of not an embedded wire but a normal wire like the wires 15a and 15b. The wires 15a and 15b may not be formed of normal wires, and a part (for example, portions positioned on the first connecting portions 5, portions positioned on the second connecting portions 6) or the whole of the wires 15a and 15b may be formed of embedded wires like the first drive coil 11. The second drive coil 12 may be formed of not an embedded wire but a normal wire like the wires 16a and 16b. The wires 16a and 16b may not be formed of normal wires, and a part (for example, portions positioned on the second connecting portions 6) or the whole of the wires 16a and 16b may be formed of embedded wires like the second drive coil 12.

In a case where some of the first drive coil 11, the second drive coil 12, the electromotive force monitoring coil 13, and the temperature monitoring resistor 14 are formed of embedded wires and the others thereof are formed of normal wires, the first drive coil 11, the second drive coil 12, the electromotive force monitoring coil 13, and the temperature monitoring resistor 14 are arranged along the same plane (the surfaces of the support 2, the first movable part 3, and the second movable part 4 facing the window member 43). Accordingly, the first drive coil 11, the second drive coil 12, the electromotive force monitoring coil 13, and the temperature monitoring resistor 14 can be easily formed in a case where the MEMS mirror 1 is to be manufactured by semiconductor manufacturing processes.

The electromotive force monitoring coil 13 may be formed of not an embedded wire but a normal wire like the wires 17a and 17b. The wires 17a and 17b may not be formed of normal wires, and a part (for example, portions positioned on the first connecting portions 5, portions positioned on the second connecting portions 6) or the whole of the wires 17a and 17b may be formed of embedded wires like the electromotive force monitoring coil 13. The temperature monitoring resistor 14 may be formed of not an embedded wire but a normal wire like the wires 18a and 18b. The wires 18a and 18b may be formed of not normal wires but embedded wires like the temperature monitoring resistor 14. The plurality of connection portions 33 may be positioned at, for example, middle portions of the respective sides of inner edges of the rectangular second portion 32.

Each second connecting portion 6 linearly extends in the embodiment, but may extend so as to meander when viewed in the optical axis direction A. In this case, each second connecting portion 6 includes, for example, a plurality of linear portions and a plurality of folded portions. The plurality of linear portions extend, for example, in a direction along the first axis X1 and are arranged side by side in a direction along the second axis X2. Alternatively, the plurality of linear portions may extend in a direction along the second axis X2 and may be arranged side by side in a direction along the first axis X1. The plurality of folded portions alternately connect both ends of adjacent linear portions. Each folded portion may extend so as to be curved or may linearly extend when viewed in the optical axis direction A. As another example where each second connecting portion 6 extends so as to meander, the second connecting portion 6 may be formed of only a portion curvedly extending or a pair of portions curvedly extending is connected to each other by a linear portion. In these cases, the width of the second connecting portion 6 is the width of the second connecting portion at an arbitrary position (for example, the width of one linear portion), and the width of the second connecting portions 6 at a certain position is the length of the second connecting portions 6 at the certain position in a direction orthogonal to both the extending direction of the second connecting portion 6 and the optical axis direction A. In a case where the second connecting portions 6 extends so as to meander and at least one end portion of each second connecting portion 6 is provided with a widened portion (stress-relieving portion), the width of the second connecting portion 6 is the width (maximum width) of a portion of the second connecting portion 6 except for the widened portion. Even in a case where the second connecting portions 6 extends so as to meander, the width of the second connecting portion 6 may be smaller than the width of the support 2. At least one of the electrode pads 21a, 21b, 22a, 22b, 23a, and 23b may be electrically connected to a drive source, a control unit, or the like via not a wire but other connecting members, such as a flexible board. The base 41 may be a wiring board, a glass epoxy board, or the like.

REFERENCE SIGNS LIST

2: support, 2e: outer edge, 3: first movable part, 4: second movable part, 7: mirror, 10: optical module, 11: first drive coil, 12: second drive coil, 13: electromotive force monitoring coil, 14: temperature monitoring resistor (temperature monitoring element), 21a, 21b, 22a, 22b: electrode pad, 15a, 15b, 16a, 16b: wire, 30: magnet, 40: package, 41: base, 41a: inner surface, 41b: outer surface, 42: side wall, 41c: recessed portion, 50: control unit, 100: distance measurement device, 101: light source, 102: photodetector, A: optical axis direction, X1: first axis, X2: second axis.

The invention claimed is:
1. An optical module comprising:
a support;
a movable part supported by the support so as to be swingable about an axis;
a mirror provided to the movable part;
a drive coil provided to the movable part;
a temperature monitoring element provided to the support; and
a magnet that generates a magnetic field acting on the drive coil, wherein
the support is thermally connected to the magnet,
a thermal conductivity of the support is 100 or more times higher than a thermal conductivity of air,
the temperature monitoring element is a temperature monitoring resistor of which a resistance value is changed in accordance with temperature, and
the temperature monitoring resistor is configured as a coil wound a plurality of times at the support.
2. The optical module according to claim 1,
wherein the movable part includes a first movable part supported by the support so as to be swingable about a first axis, and a second movable part supported by the support so as to be swingable about a second axis crossing the first axis,
the mirror is provided to the first movable part,
the first movable part is connected to the second movable part so as to be swingable about the first axis, and
the second movable part is connected to the support so as to be swingable about the second axis.
3. The optical module according to claim 2,
wherein the drive coil includes a first drive coil provided to the first movable part.
4. The optical module according to claim 3, further comprising:
an electromotive force monitoring coil provided to the first movable part,
wherein the magnet generates a magnetic field acting the drive coil and the electromotive force monitoring coil.

5. The optical module according to claim 2,
wherein the drive coil includes a second drive coil provided to the second movable part.

6. The optical module according to claim 5, further comprising:
an electromotive force monitoring coil provided to the first movable part,
wherein the magnet generates a magnetic field acting the drive coil and the electromotive force monitoring coil.

7. The optical module according to claim 5, further comprising:
an electromotive force monitoring coil provided to the second movable part,
wherein the magnet generates a magnetic field acting the drive coil and the electromotive force monitoring coil.

8. The optical module according to claim 1,
wherein the movable part includes a first movable part supported by the support so as to be swingable about a first axis, and a second movable part supported by the support,
the mirror is provided to the first movable part,
the first movable part is connected to the second movable part so as to be swingable about the first axis,
the second movable part is connected to the support so that the first movable part is swingable about the first axis by vibration of the second movable part, and
the drive coil includes a second drive coil provided to the second movable part.

9. The optical module according to claim 8, further comprising:
an electromotive force monitoring coil provided to the first movable part,
wherein the magnet generates a magnetic field acting the drive coil and the electromotive force monitoring coil.

10. The optical module according to claim 8, further comprising:
an electromotive force monitoring coil provided to the second movable part,
wherein the magnet generates a magnetic field acting the drive coil and the electromotive force monitoring coil.

11. The optical module according to claim 2, further comprising:
a connecting portion that connects the first movable part to the second movable part so that the first movable part is swingable about the first axis,
wherein a width of the support is larger than a width of the connecting portion when viewed in an optical axis direction of the mirror.

12. The optical module according to claim 2, further comprising:
a connecting portion that connects the second movable part to the support so that the second movable part is swingable about the second axis crossing the first axis,
wherein a width of the support is larger than a width of the connecting portion when viewed in an optical axis direction of the mirror.

13. The optical module according to claim 1, further comprising:
an electrode pad provided to the support; and
a wire connected to one end of the drive coil and the electrode pad,
wherein the electrode pad is provided inside the temperature monitoring resistor when viewed in an optical axis direction of the mirror.

14. The optical module according to claim 1,
wherein the support is formed in a frame shape so as to surround the movable part when viewed in an optical axis direction of the mirror.

15. The optical module according to claim 1,
wherein the temperature monitoring element is provided to the support along an outer edge of the support when viewed in an optical axis direction of the mirror.

16. The optical module according to claim 1,
wherein the drive coil and the temperature monitoring element are arranged along a same plane.

17. The optical module according to claim 4,
wherein the drive coil, the electromotive force monitoring coil, and the temperature monitoring element are arranged along a same plane.

18. The optical module according to claim 1,
wherein the drive coil is embedded in the movable part.

19. The optical module according to claim 4,
wherein the electromotive force monitoring coil is embedded in the movable part.

20. The optical module according to claim 1,
wherein the temperature monitoring element is embedded in the support.

21. The optical module according to claim 1, further comprising:
a package that accommodates the support, the movable part, the mirror, the drive coil, and the temperature monitoring element,
wherein the support is mounted on an inner surface of a base that is a part of the package, and
the magnet is mounted on an outer surface of the base so as to face the movable part.

22. The optical module according to claim 21,
wherein a recessed portion is formed on the inner surface of the base so as to face the movable part.

23. The optical module according to claim 21,
wherein the package includes a tubular side wall disposed so as to surround the support when viewed in an optical axis direction of the mirror, and
a thickness of the base in an optical axis direction of the mirror is smaller than a distance between the side wall and the support when viewed in an optical axis direction of the mirror.

24. The optical module according to claim 4, further comprising:
a control unit that controls drive current to be applied to the drive coil based on a detection value of the temperature monitoring element and an electromotive force generated on the electromotive force monitoring coil.

25. A distance measurement device comprising:
the optical module according to claim 1;
a light source that emits laser light; and
a photodetector that detects the laser light through an object and the mirror.

* * * * *